United States Patent [19]

Arima et al.

[11] Patent Number: 4,722,023

[45] Date of Patent: Jan. 26, 1988

[54] LAMP ASSEMBLY FOR EMITTING A BEAM OF LIGHT AT AN ANGLE TO ITS OPTICAL AXIS

[75] Inventors: Kenji Arima; Syoji Kobayashi; Hideaki Satsukawa, all of Shizuoka, Japan

[73] Assignee: Koito Seisakusho Co., Ltd., Tokyo, Japan

[21] Appl. No.: 733,573

[22] Filed: May 13, 1985

[30] Foreign Application Priority Data

May 15, 1984 [JP] Japan .................................. 59-97340
Dec. 27, 1984 [JP] Japan ................................ 59-201606

[51] Int. Cl.$^4$ ............................................... B60Q 1/00
[52] U.S. Cl. .................................... 362/80; 362/309; 362/61
[58] Field of Search ................ 362/309, 310, 337, 61, 362/80, 297, 311307, 347, 348, 342

[56] References Cited

U.S. PATENT DOCUMENTS

| | | | |
|---|---|---|---|
| 1,081,211 | 12/1913 | Churchill | 362/309 |
| 1,284,019 | 11/1918 | Wood | 362/309 |
| 1,348,618 | 8/1920 | Zorger | 362/309 |
| 1,413,415 | 4/1922 | McPech | 362/342 |
| 1,574,888 | 3/1926 | Hixson | 362/342 |
| 1,735,209 | 11/1929 | Nelson | 362/342 |
| 1,885,622 | 11/1932 | O'Meara | 362/309 |
| 1,942,136 | 1/1934 | Carter et al. | 362/348 |
| 1,985,966 | 1/1935 | Wood | 362/342 |
| 2,101,199 | 12/1937 | Rolph | 362/309 |
| 2,119,370 | 5/1938 | Van Leunen | 362/309 |
| 2,478,308 | 8/1949 | Overstreet | 362/342 |
| 3,064,125 | 11/1962 | Gott | 362/309 |
| 3,185,034 | 5/1965 | Youngblood | 362/348 |
| 3,255,342 | 6/1966 | Seitz et al. | 362/309 |
| 3,398,274 | 8/1968 | Rex | 362/348 |
| 3,436,758 | 4/1969 | Kluth . | |
| 3,517,384 | 6/1970 | Jablonski . | |
| 4,153,928 | 5/1979 | Speedy | 362/337 |
| 4,158,222 | 6/1979 | Cook | 362/309 |
| 4,446,511 | 5/1984 | Sands | 362/309 |
| 4,463,411 | 7/1984 | Proctor . | |
| 4,480,291 | 10/1984 | Dranginis | 362/342 |
| 4,545,007 | 10/1985 | Nagel | 362/309 |
| 4,559,589 | 12/1985 | Sasumann | 362/307 |
| 4,644,455 | 2/1987 | Inglus et al. | 362/309 |
| 4,652,979 | 3/1987 | Arima | 362/309 |

FOREIGN PATENT DOCUMENTS

| | | | |
|---|---|---|---|
| 657823 | 3/1938 | Fed. Rep. of Germany | 362/309 |
| 460666 | 1/1937 | United Kingdom | 362/309 |

Primary Examiner—James C. Yeung
Assistant Examiner—H. A. Odar
Attorney, Agent, or Firm—Browdy and Neimark

[57] ABSTRACT

A lamp assembly is disclosed as adapted for use as a supplemental high mounted stop lamp for motor vehicles. A lamp body has a paraboloidal reflector for producing parallel rays of light from a source mounted therein. For reducing the axial dimension of the lamp body to a minimum, a generally planar lens is mounted at its open front end, with the lens having a multiplicity of prism elements formed on its outer surface for internally reflecting the parallel rays in a direction at a considerable angle to the axis of the reflector. Additional embodiments are disclosed for imparting both lateral and vertical divergence to the light beam emitted, and for producing two vertically overlapping light beams.

8 Claims, 28 Drawing Figures

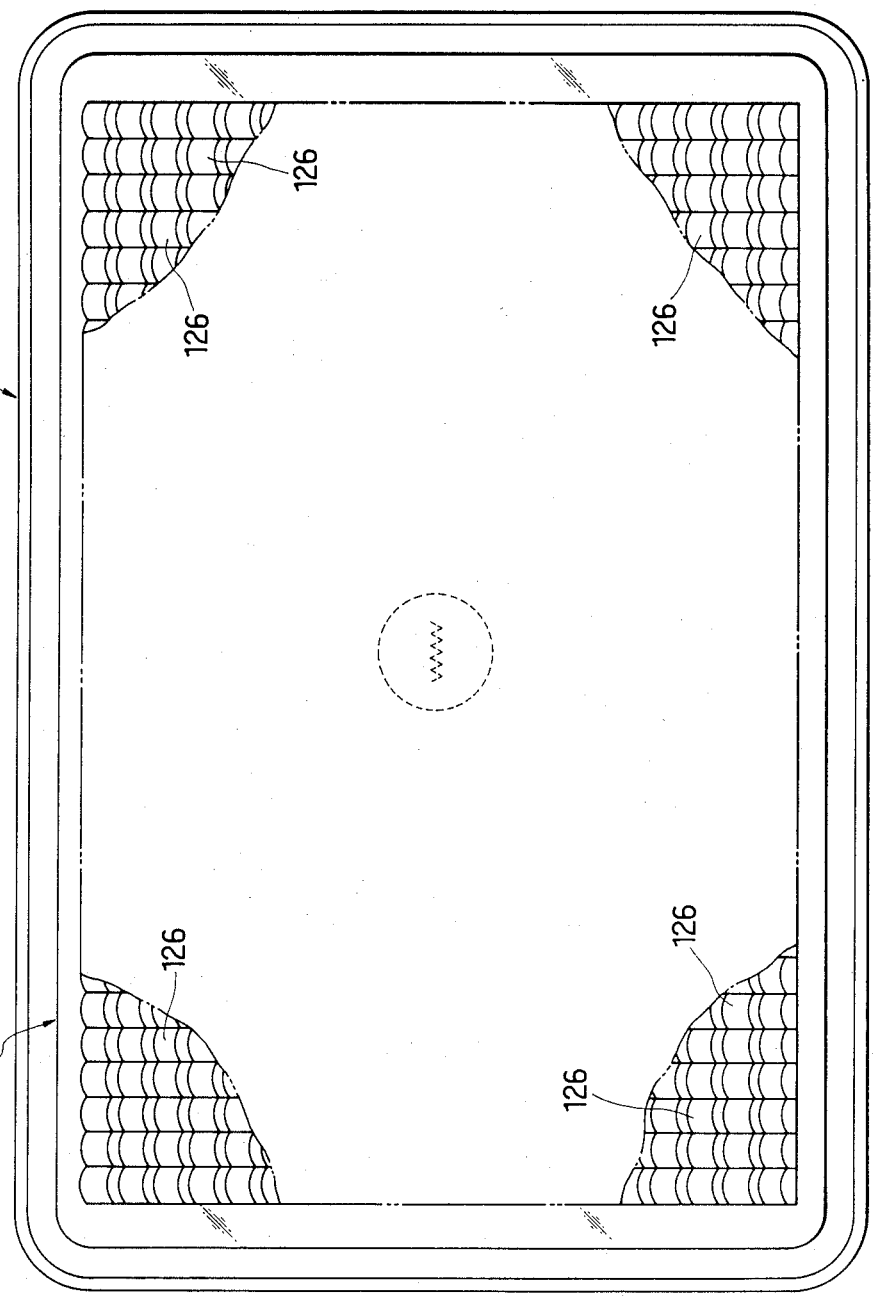

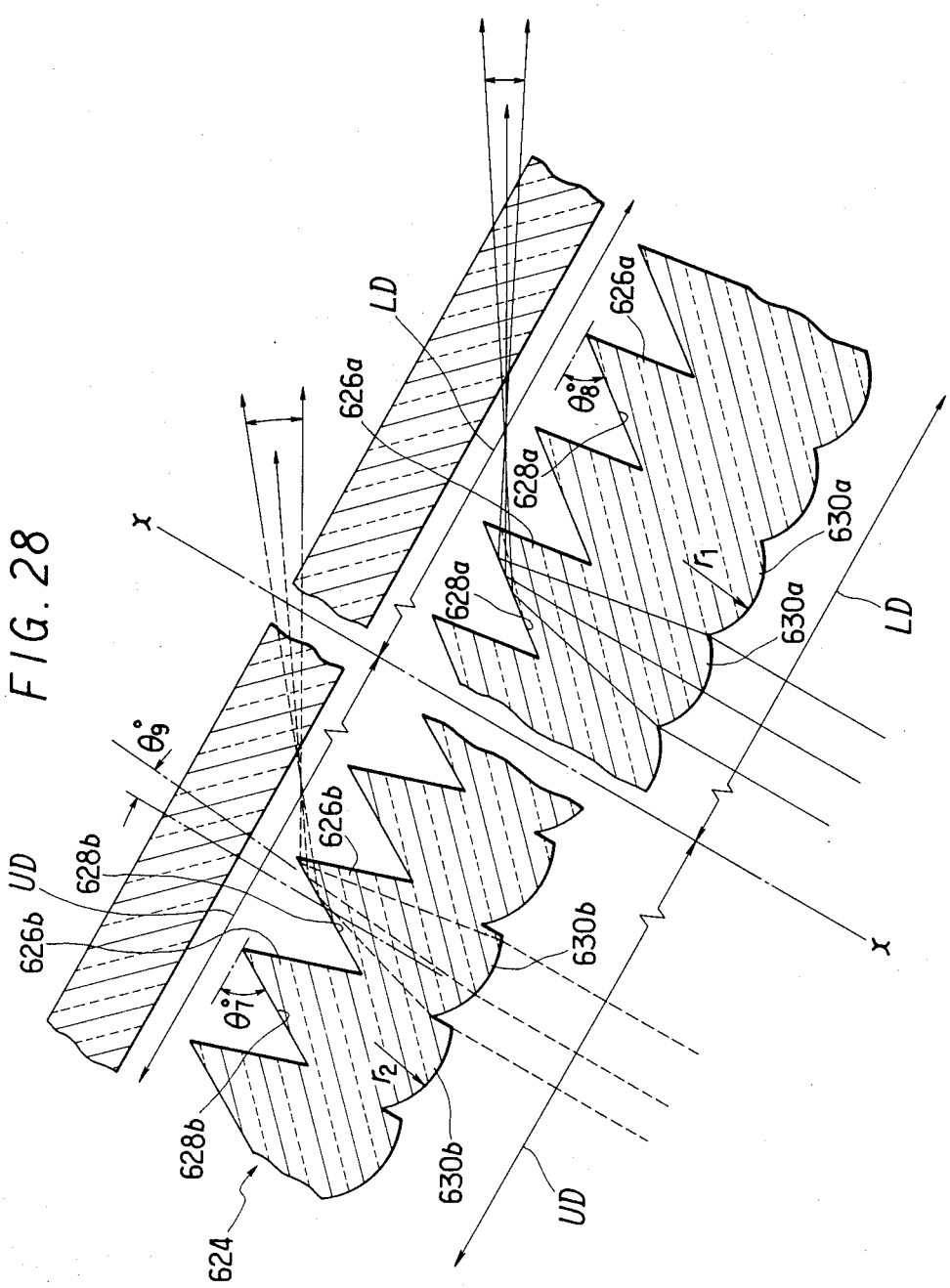

LAMP ASSEMBLY FOR EMITTING A BEAM OF LIGHT AT AN ANGLE TO ITS OPTICAL AXIS

BACKGROUND OF THE INVENTION

This invention relates to lamps in general and, in particular, to a lamp assembly capable of throwing a beam of light in a preassigned direction at a considerable angle to its optical axis. The lamp assembly in accordance with the invention lends itself to use as, typically, a supplemental high mounted stop lamp on motor vehicles.

As the name implies, supplemental high mounted stop lamps are additional lamps of a vehicular stop lamp system that are mounted high, and typically interiorly of the vehicle rear window, for giving a steady warning light through intervening vehicles to operators of following vehicles. Some motor vehicles to say, passenger cars, in particular, have their rear windows arranged a considerable angle out of the perpendicular for hydrodynamic reasons or from design considerations. In mounting supplemental stop lamps interiorly on such a steeply slanting rear window, it is desired that their sealing plane be parallel to the window. So mounted, the stop lamps must of course emit beams of light at a considerable angle to their seating plane.

A typical conventional supplemental stop lamp intended for such use includes a lamp body to be mounted horizontally with its sloping front end held interiorly against the vehicle rear window. The lamp body has at its rear end a praaboiloidal reflector for producing parallel rays of light from a bulb positioned at its focus. Mounted at the open front end of the lamp body is a generally planar lens which is set parallel to the vehicle rear window and so at a great angle to the lamp axis. The lens has a multiplicity of diverging lens elements formed thereon for diverging the parallel light rays both laterally and vertically, so that the resulting beam may reach a sufficiently wide area to the rear of the vehicle.

The prior art stop lamp of the foregoing construction must have a vertical dimension, transverse to its optical axis, of not less than a prescribed limit to give a required degree of beam intensity. Because of the slanting rear window, however, the desired vertical dimension is gained only by correspondingly increasing the lens dimension in the height direction of the lamp parallel to the window. This in turn requires an increase in the axial dimension of the lamp body, resulting in the inconvenient bulging of the lamp body toward the interior of the vehicle.

In addition to such mechanical or dimensional difficulties, the prior art stop lamp has an optical problem as well. The parallel rays of light produced by the paraboiloidal reflector are rendered divergent as aforesaid by the multiple lens elements that are molded in one piece as the generally planar lens member at the slanting front end of the lamp body. The lens member is mounted at such an angle to the optical axis of the lamp assembly that no negligible proportion of the parallel light rays from the reflector is reflected away therefrom, instead of transversing same thereby to be diverged for beam coverage over a greater area. No effective measure is known to the present applicant that has heretofore been taken for the avoidance of such waste of light energy in the stop lamp of the type in question.

SUMMARY OF THE INVENTION

The present invention provides an improved lamp assembly capable of emitting a beam or beams of light at an angle to its optical axis, which lamp assembly can be far smaller in size than the comparable prior art device for a given output light intensity. The invention also solves the problem of how to make utmost use of the internally generated light energy for the actual irradiation purpose, as well as of how to realize an optimum intensity distribution of the output beam or beams as in the use of the lamp assembly as a supplemental high mounted stop lamp on a motor vehicle or the like.

Stated in its simplest form, the lamp assembly in accordance with the invention comprises a lamp body having a reflector for producing rays of light parallel to the optical axis of the lamp assembly from a light source mounted within the lamp body. The lamp body has an open front end at which there is mounted a generally planar lens lying in a plane perpendicular to the optical axis of the lamp assembly. The lens is formed to include a plurality of prism elements on its outer surface, away from the reflector, each prism element having a reflective surface for internally reflecting the parallel rays of light from the reflector in a predetermined direction at an angle to the lamp axis.

In the preferred embodiment of this invention to be presented subsequently, in which the invention will be illustrated as embodied in supplemental high mounted stop lamps for motor vehicles, the lamp is mounted with its optical axis disposed perpendicular, and with its lens held parallel, to the rear window of the vehicle. Even though the vehicle rear window may be steeply inclined, the prism elements can reorient the parallel rays of light in the desired direction in which the beam is to be thrown by the lamp. The depth dimension of the lamp assembly, as measured horizontally from the vehicle rear window toward the vehicle interior, can be reduced to a minimum to provide a beam of required intensity, so that the lamp assembly can be compactly mounted on the inside of the rear window.

The lamp assembly of the above fundamental configuration admits of ready adaptation for making the light beam divergent in both lateral and horizontal directions. Beam divergence is easy to realize, as by convexing the reflective surfaces of the prism elements, and/or by providing additional divergent lens elements, as will be set forth in more detail in some of the following embodiments.

An embodiment will also be disclosed wherein substantially all of the light rays generated by the internal source of the lamp assembly are made to impinge on the reflective surfaces of the prism elements, thereby to be reflected and sent out as the output beam of the lamp assembly. The invention thus eliminates the waste of light energy that has been unavoidable in the prior art stop lamp employing diverging lens elements.

Additional embodiments will be presented wherein the lamp assembly emits two split light beams that are at a slight vertical angle to each other but which mostly overlap. The resulting composite beam affords an intensity distribution that is particularly favorable in the use of the lamp assembly as a high mounted stop lamp. Such an intensity distribution is attained, moreover, without increasing the thickness of the lens or the depth dimension of the complete lamp assembly.

The above and other features and advantages of this invention and the manner of realizing them will become more apparent, and the invention itself will best be understood, from a study of the following description and appended claims, with reference had to the attached drawings showing the preferred embodiments of the invention.

BRIEF DESCRIPTION OF THE DRAWINGS

FIG. 5 is a front elevation of the supplemental stop lamp of FIG. 4;

FIG. 28 is an enlarged, fragmentary axial section through the supplemental stop lamp of FIG. 26, which is explanatory of operation.

DESCRIPTION OF THE PREFERRED EMBODIMENTS

Figure 1:
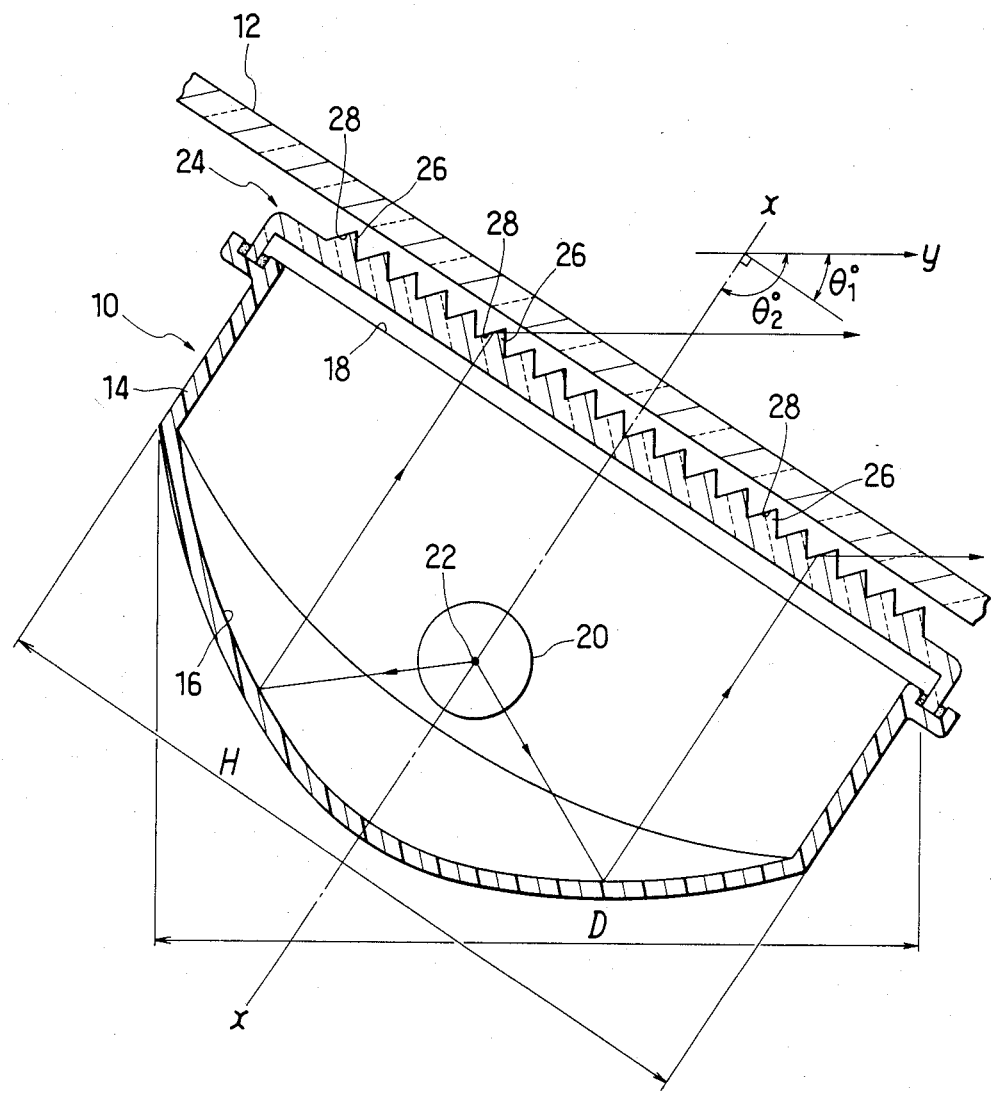
FIG. 1 is an axial section through a preferred form of the lamp assembly constructed in accordance with the novel concepts of this invention, the lamp assembly being herein shown as typified by a supplemental high mounted stop lamp for vehicular use.
Figure 2:
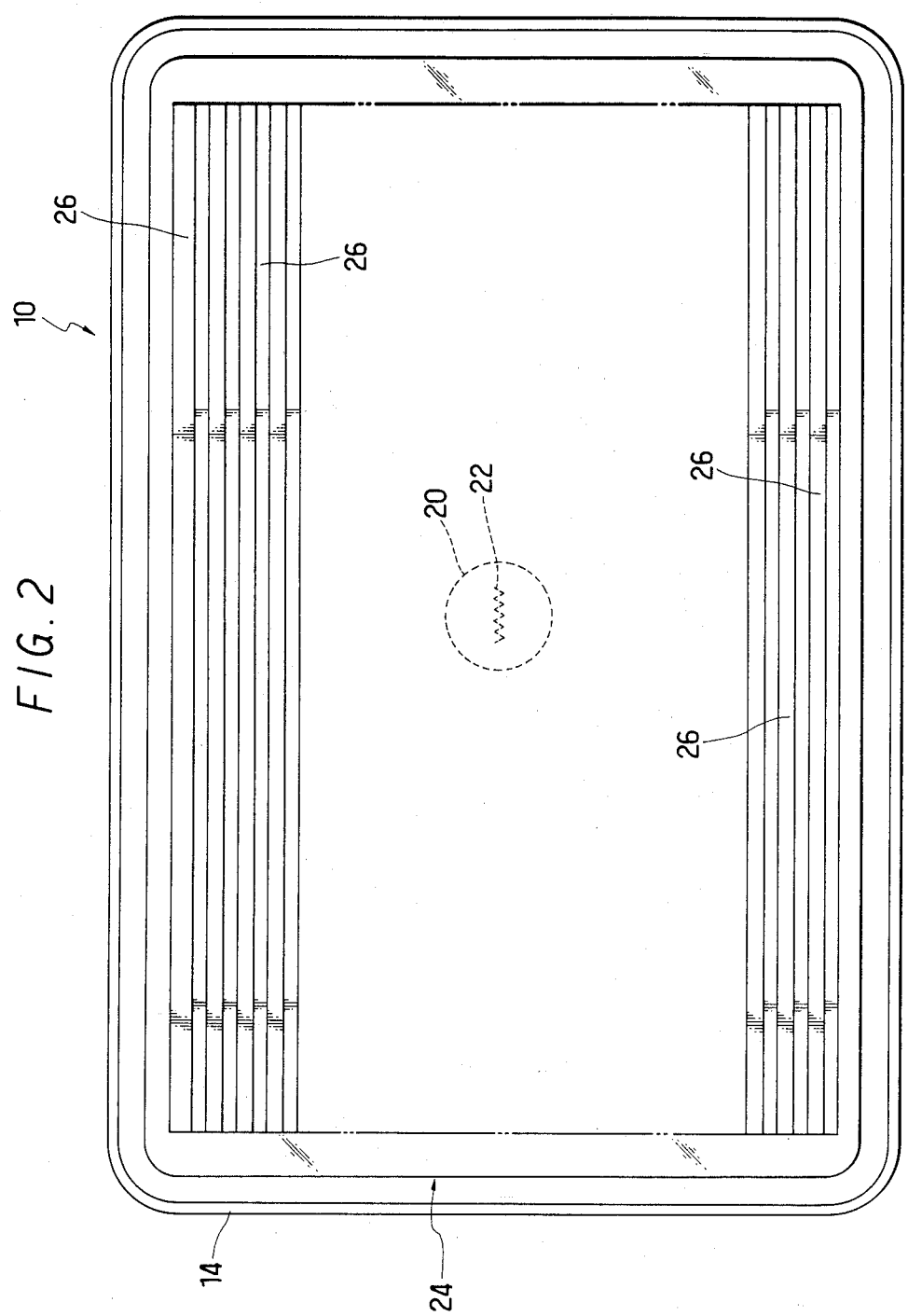
FIG. 2 is a front elevation of the supplemental stop lamp of FIG. 1.
Figure 3:
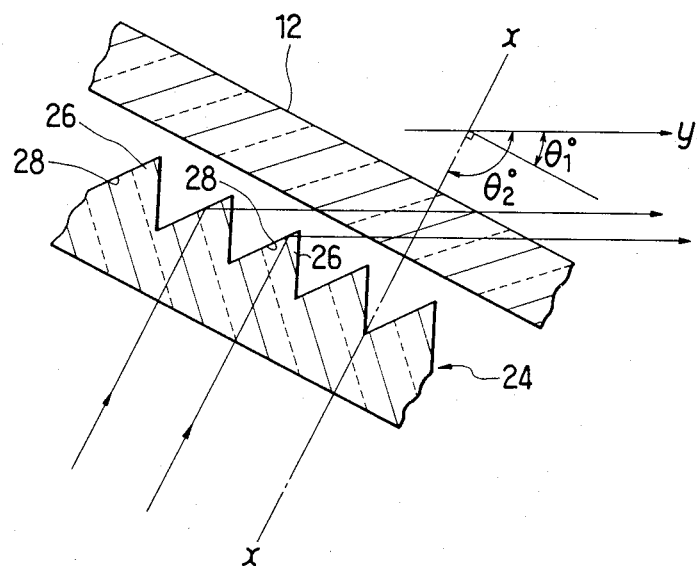
FIG. 3 is an enlarged, fragmentary axial section through the supplemental stop lamp of FIG. 1, the view being explanatory of the optical performance of the lamp.

The present invention will now be described in terms of its preferable embodiments wherein the lamp assembly in accordance with the invention is adapted for use as supplemental high mounted stop lamps on motor vehicles. The supplemental stop lamp of FIGS. 1 through 3 is generally designated 10 and therein shown mounted internally of a sloping pane of glass 12 of a vehicular rear window. The stop lamp 10 includes a lamp body 14 having a paraboloidal reflector 16 at its rear end, directed away from the window glass 12, and an open front end 18. The paraboloidal reflector 16 is centered about the optical axis x—x of the stop lamp 10. This optical axis is set at a prescribed angle to the direction y to the rear of the vehicle in which stop lamp 10 is to throw a beam of light.

Mounted within the lamp body 14 is a light source such as a conventional bulb 20 having a filament 22. This bulb filament 22 is located at the focus of the paraboloidal reflector 16, so that the rays of light produced by the bulb 20 become parallel to the optical axis x—x.

A generally planar lens 24 is mounted at the open front end 18 of the lamp body 14 and is disposed in a plane perpendicular to the optical axis x—x and approximately parallel to the plane of the window glass 12. The lens 24 is at an angle $\theta 1°$ to the predetermined beam direction y. Hence, if the optical axis x—x is at an angle $\theta 2°$ to the beam direction y, then $$\theta 2° = \theta 1° + 90°.$$

As will be seen from both FIGS. 1 and 2, the lens 24 is formed to include a plurality or multiplicity of prism elements 26 on its front or outer surface directed away from the reflector 16. The prism elements 26 are shown as parallel ridges of triangular cross section extending horizontally or laterally of the stop lamp 10. Thus each prism element 26 has a pair of sloping, planar sides, one of which, located away from the beam direction y and designated 28, is so angled as to internally reflect the parallel light rays from the paraboloidal reflector 16 in the beam direction y.

Such being the construction of the improved supplemental high mounted stop lamp in accordance with the invention, it will be seen that the paraboilodal reflector 16 reflects the rays of light from the bulb 20 all in a direction parallel to the optical axis x—x. The parallel light rays are then internally reflected by the sloping surfaces 28 of the prism elements 26 of the planar lens 24 in the predetermined direction y.

Thus, by mounting the stop lamp 10 with its optical axis x—x oriented at the predetermined angle to the beam direction y, the present invention to make it possible to reduce the depth dimension D of the stop lamp to a minimum without unduly decreasing its height dimension H. The height dimension of the paraboloidal reflector 16 can indeed be made much greater than that of the prior art for the provision of an efficient, high candlepower lamp assembly. Furthermore, with its depth dimension D minimized as above, the stop lamp 10 will not inconveniently protrude toward the interior of the vehicle if mounted on its rear window sloping very steeply.

Second Form

Figure 6:
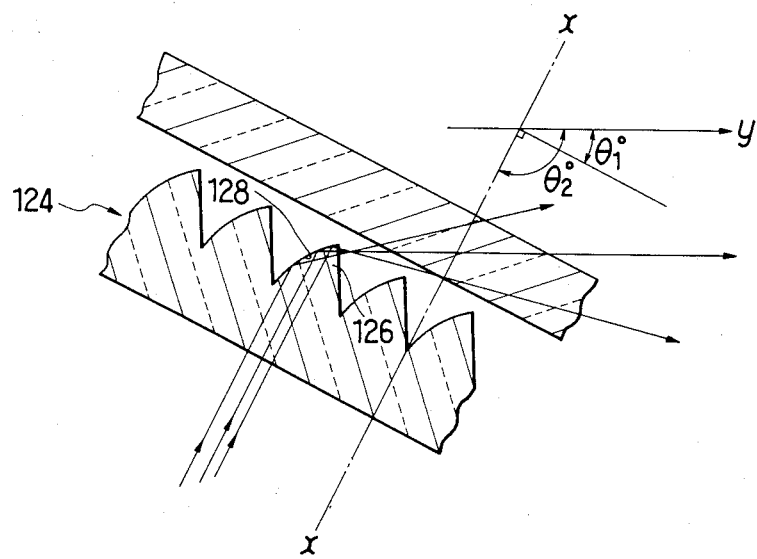
FIG. 6 is an enlarged, fragmentary axial section through the supplemental stop lamp of FIG. 4, the view being explanatory of the optical performance of the lamp.
Figure 4:
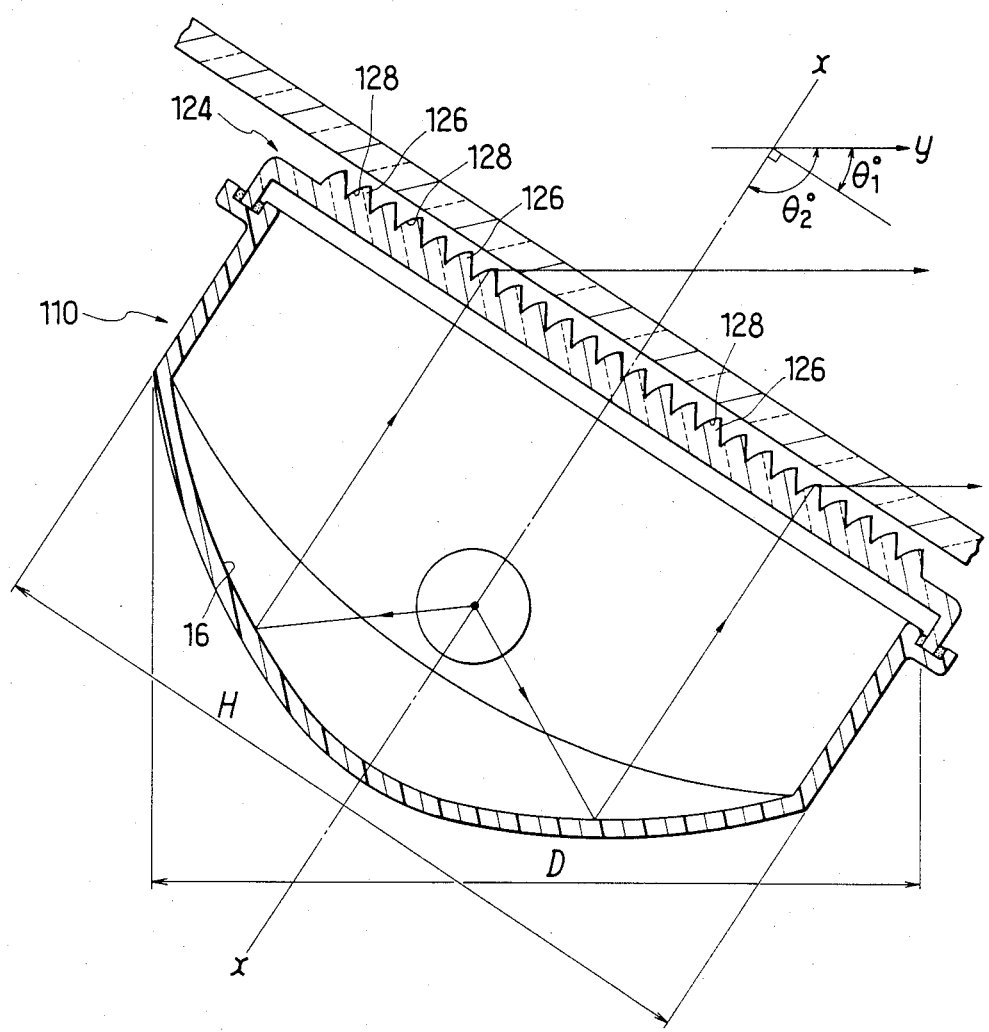
FIG. 4 is an axial section through another example of supplemental high mounted stop lamp embodying the present invention.
Figure 7:
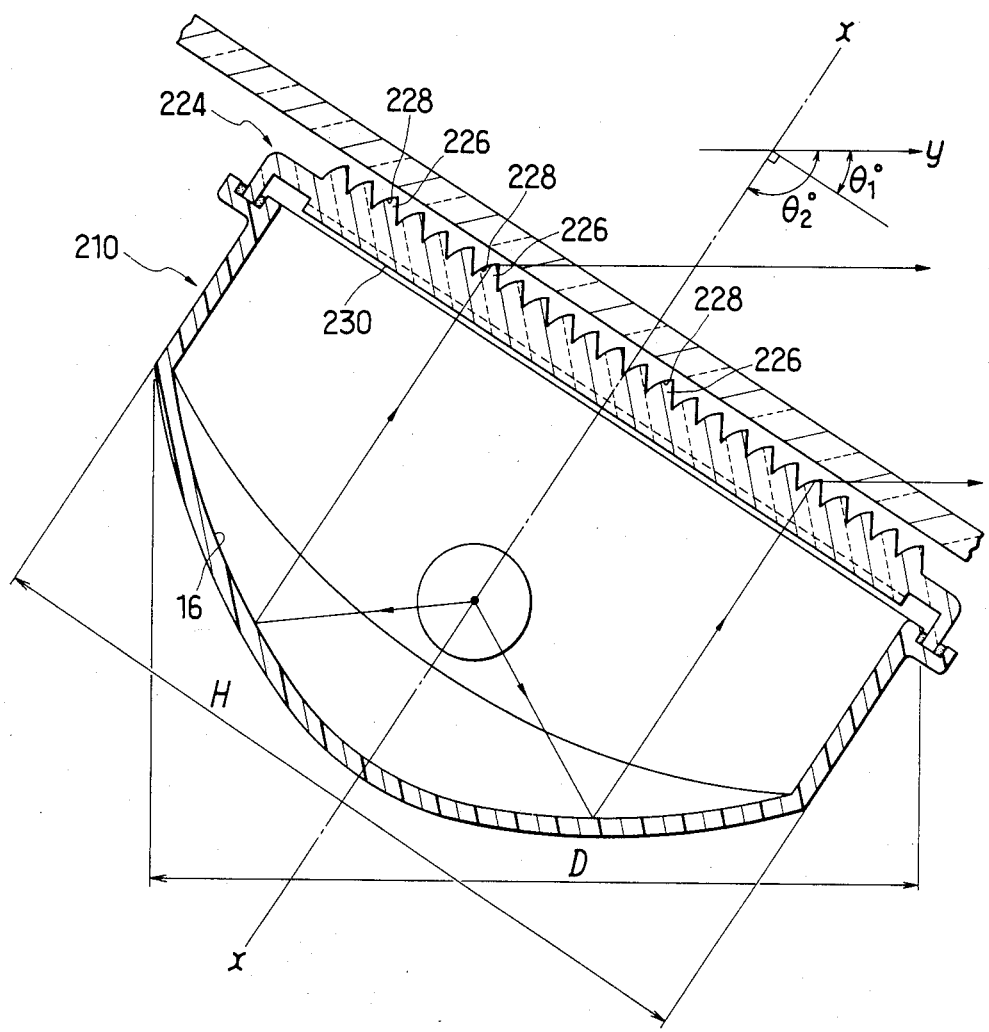
FIG. 7 is an axial section through still another example of supplemental high mounted stop lamp embodying the present invention.
Figure 8:
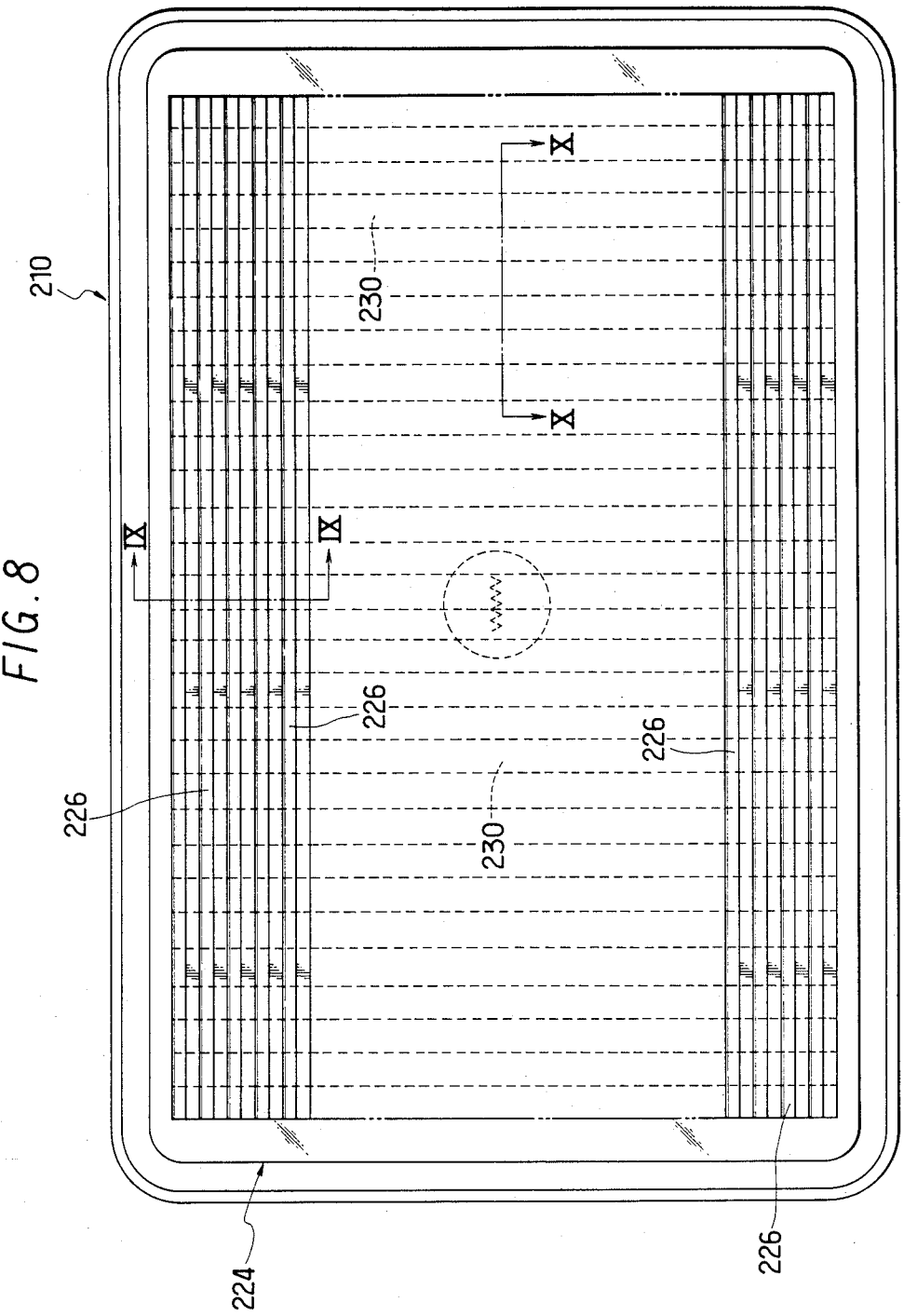
FIG. 8 is a front elevation of the supplemental stop lamp of FIG. 7.
Figure 9:
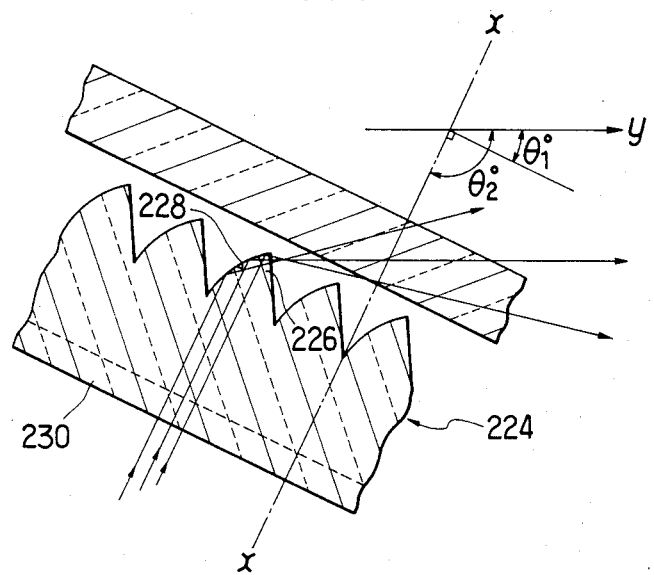
FIG. 9 is an enlarged, fragmentary, vertical axial section through the supplemental stop lamp of FIG. 7, taken along the line IX—IX in FIG. 8 and showing in particular the functioning of the prism elements on the outer surface of the lens.

The supplemental high mounted stop lamp 110 of FIGS. 4 through 6 features a modified planar lens 124. This modified lens is formed to include a multiplicity of prism elements 126 arrayed in rows and columns on its outer surface, as best seen in FIG. 5. Each prism element 126 has a convex reflective surface 128 oriented away from the predetermined direction y in which the stop lamp 110 is to throw light. By the "convex" reflective surface 128 is meant that the surface is externally shaped like part of a sphere. This stop lamp 110 is identical in the other details of construction with the stop lamp 10 of FIGS. 1 through 3.

Thus, as the parallel light rays from the paraboloidal reflector 16 fall on the lens 124, the convex reflective surfaces 128 of its prism elements 126 largely reflect the light rays in the predetermined beam direction y. In this embodiment, however, the convex reflective surfaces 128 of the prism elements 126 further function to diverge the incident rays both vertically and horizontally, as indicated in FIG. 6. Such a divergent beam from the stop lamp 110 can be recognized over a wider area to the rear of the vehicle than if the beam is coherent. The vertical and horizontal angles of beam divergence depend upon the radius of curvature of the convex reflective surfaces 128. As desired, the vertical and horizontal angles of beam divergence may be varied by making correspondingly different the radii of curvature of the reflective surfaces 128 in such directions.

Third Form

In FIGS. 7 through 10 is shown a further example of supplimental high mounted stop lamp 210 in accordance with the invention, which features a modified lens 224 of generally planar configuration. This lens has formed on its outer surface a plurality or multiplicity of prism elements 226 in the form of parallel ridges of approximately triangular cross section extending laterally or horizontally. The prism elements 226 have reflective surfaces 228, oriented away from the predetermined beam direction y, which are convex in shape. Consequently, internally reflected by these reflective surfaces 228 of the prism elements 226, the light rays become divergent in a vertical direction, as clearly indicated in FIG. 9.

Figure 10:
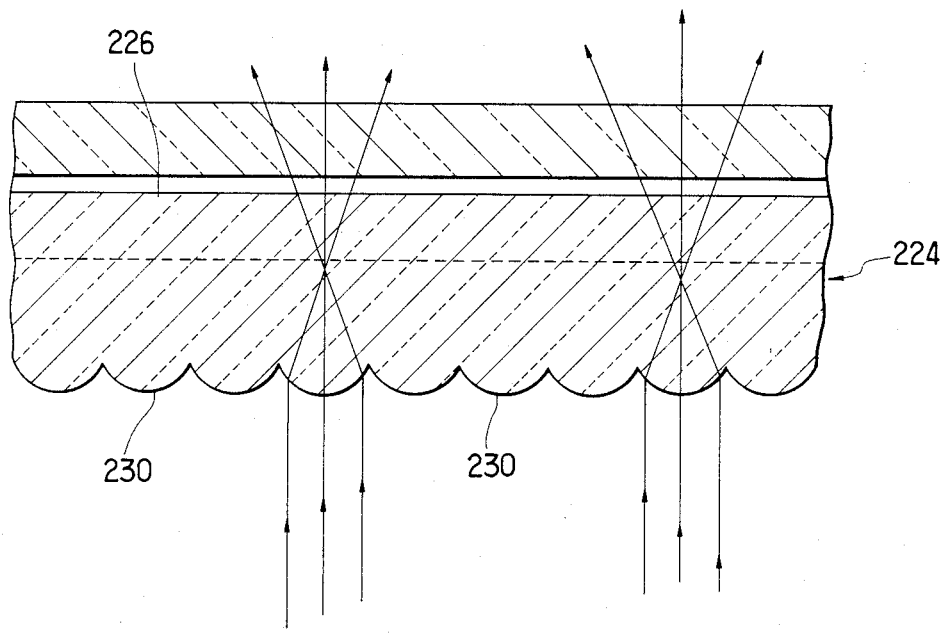
FIG. 10 is also an enlarged, fragmentary, lateral axial section through the supplemental stop lamp of FIG. 7, taken along the line X—X in FIG. 8 and showing in particular the functioning of the lens elements on the inner surface of the lens.

The planar lens 224 has further formed on its inner surface, directed toward the paraboloidal reflector 16, a plurality or multiplicity of diverging lens elements 230 in the form of parallel ridges of approximately semicircular cross section, as depicted in FIG. 10. Extending at right angles with the prism elements 226 on the outer surface of the lens 224, the lens elements 230 function to diverge the incoming rays laterally. The stop lamp 210 is identical in the other details of construction with the stop lamp 10 of FIGS. 1 through 3.

Thus, upon falling on the planar lens 224, the parallel light rays from the paraboloidal reflector 16 are first diverged laterally by its interior diverging lens elements 230, as best illustrated in FIG. 10. Then the laterally diverging light rays are internally reflected by the convex reflective surfaces 228 of the exterior prism elements 226 of the lens 224, thereby both to be largely oriented in the predetermined beam direction y and to be diverged vertically, as will be seen from FIG. 9. The beam emitted by this stop lamp 210, although oriented in the predetermined direction y, is nevertheless divergent both vertically and laterally.

It will be appreciated that both diverging lens elements 230 and reflective surfaces 228 of the lens 224 can be in the shape of simple convexities. The mold for the fabrication of this lens 224 can therefore be prepared easily to close dimensional tolerances.

Fourth Form

FIGS. 11 through 14 illustrate a further example of supplemental high mounted stop lamp 310 in accordance with the invention. Unlike the foregoing embodiments this stop lamp 310 has two generally planar lenses 324 and 332 mounted one behind the other at the open front end 18 of the lens body 14. The lens 324, which is somewhat analogous in fuctnion with the lens 24 of the FIGS. 1 through 3 stop lamp 10, will hereinafter be referred to as the outer lens as it is disposed outwardly of the other lens 332, and this latter lens 332 will be referred to as the inner lens. This stop lamp 310 is akin to the stop lamp 10 in the other details of construction.

Figure 11:
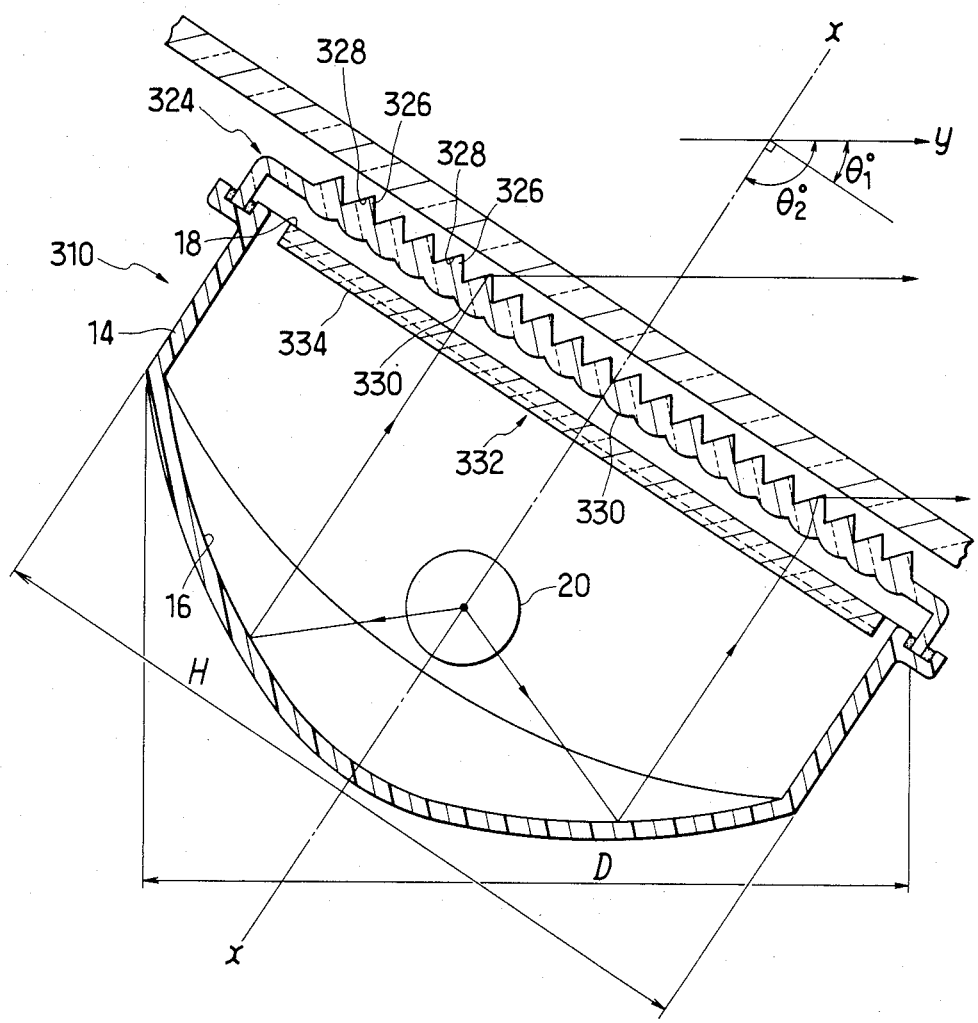
FIG. 11 is an axial section through yet another example of supplemental high mounted stop lamp embodying the present invention.
Figure 12:
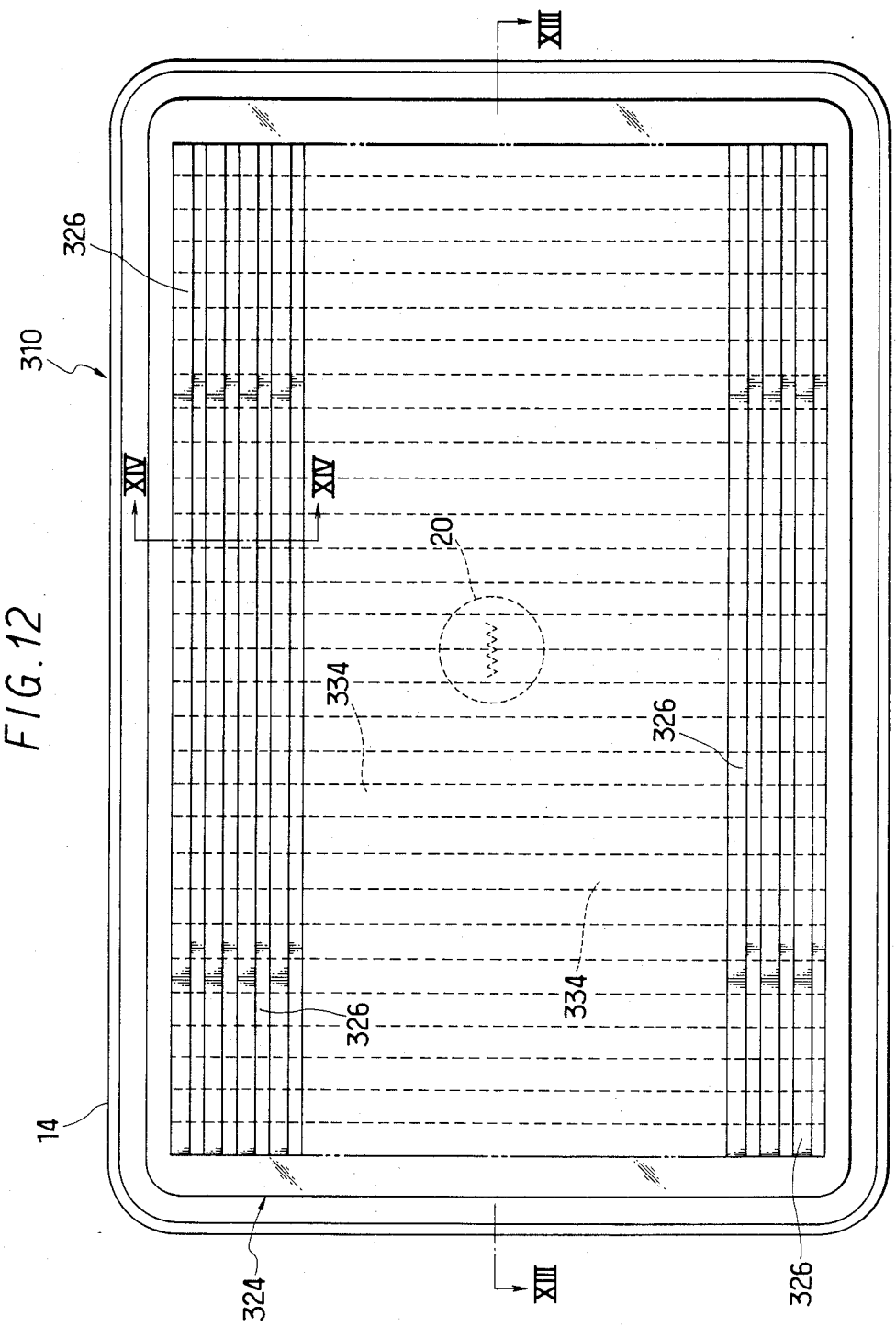
FIG. 12 is a front elevation of the supplemental stop lamp of FIG. 11.

As will be seen from both FIGS. 11 and 12, the outer lens 324 has formed on its outer surface a plurality or multiplicity of prism elements 326 similar to the prism elements 26 of the FIGS. 1 through 3 embodiment, being in the form of parallel ridges of approximately triangular cross section extending laterally or horizontally. The prism elements 326 have planar reflective surfaces 328, oriented away from the predetermined beam direction y, for internally reflecting the incident light rays in that beam direction. The outer lens 324 has further formed on its inner surface, directed toward the paraboloidal reflector 1, a plurality or multiplicity of diverging lens elements 330 in the form of parallel ridges of approximately semicircular cross section, as depicted in FIG. 11. Extending in the same direction as the prism elements 326 on the outer surface of the outer lens 324, the diverging lens elements 330 function to diverge the incoming rays vertically.

Figure 13:
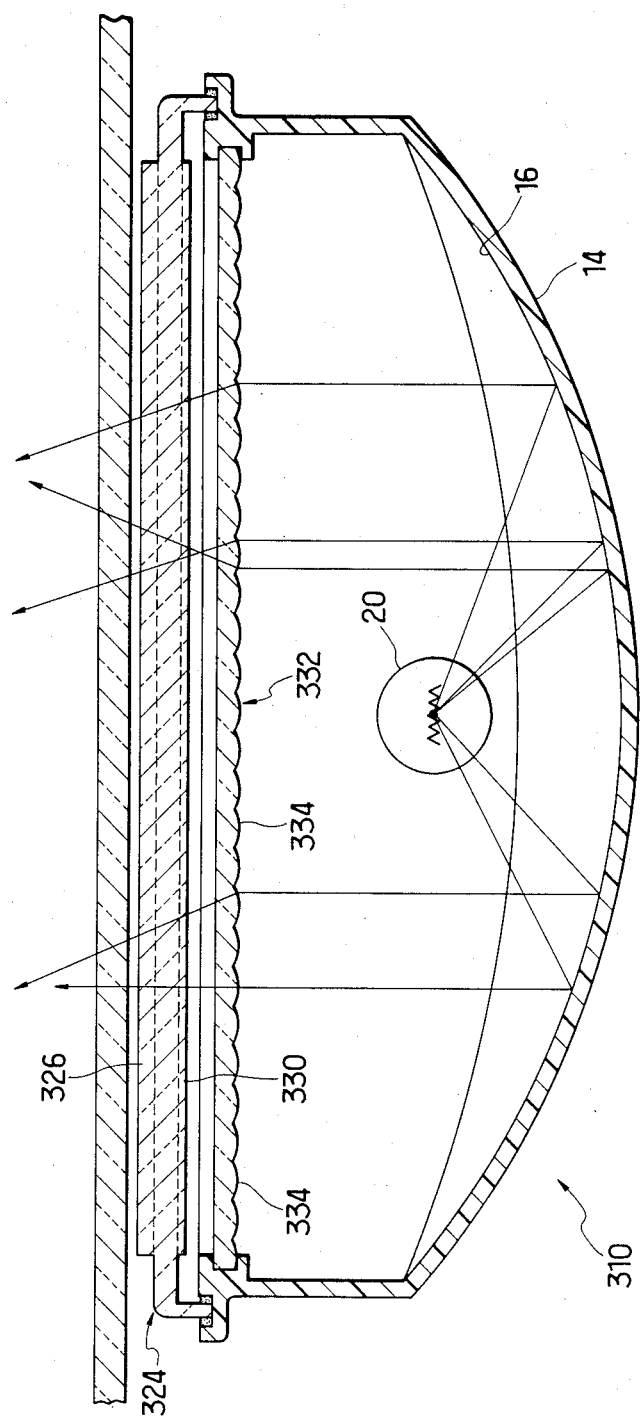
FIG. 13 is a lateral axial section through the supplemental stop lamp of FIG. 11, taken along the line XIII—XIII of FIG. 12.
Figure 14:
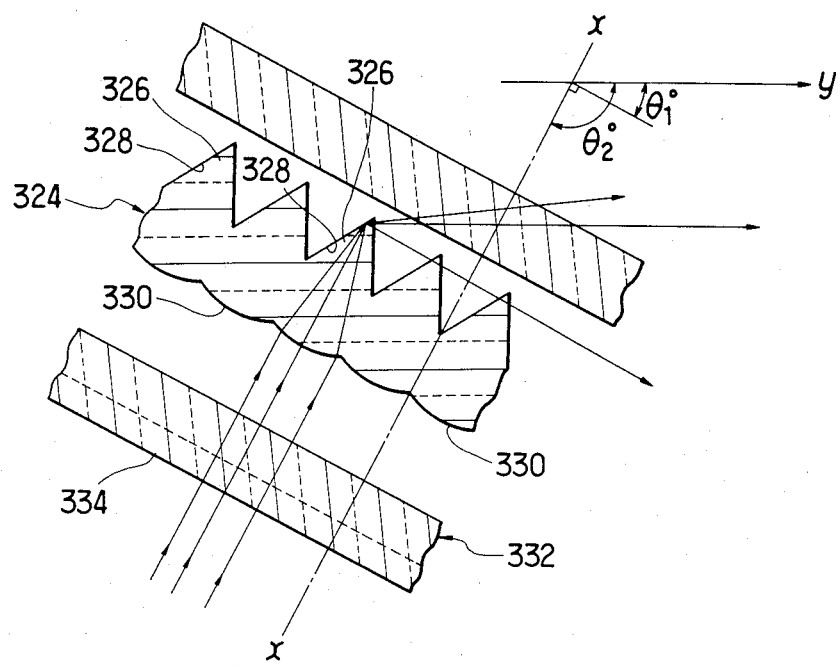
FIG. 14 is an enlarged, fragmentary, vertical section through the supplemental stop lamp of FIG. 11, taken along the line XIV—XIV of FIG. 12 and being explanatory of operation.

With particular reference to FIG. 13 the inner lens 332 has a plurality or multiplicity of diverging lens elements 334 formed on its inner surface. The diverging lens elements 334 take the form of parallel ridges of substantially semicircular cross section extending in its height direction, or at right angles with the prism elements 326 and diverging lens elements 330 on the outer lens 324. The lens elements 334 function to diverge the incident light rays laterally of the stop lamp 310. The outer surface of the inner lens 332 is planar.

Thus, in this stop lamp 310, the light rays produced by the bulb 20 and rendered parallel to the optical axis x—x by the paraboloidal reflector 16 are rendered divergent laterally on traversing the diverging lens elements 334 of the inner lens 332. The arrow headed lines in FIG. 13 represent such trajectories of the light rays through the inner lens 332. Then, subsequently traversing the diverging lens elements 330 of the outer lens 324, the light rays are thereby made divergent vertically. Then the light is internally reflected by the reflective surfaces 328 of the prism elements 326 of the outer lens 324, thereby to be emitted in the predetermined direction y in the form of a both laterally and vertically divergent beam.

Figure 15:
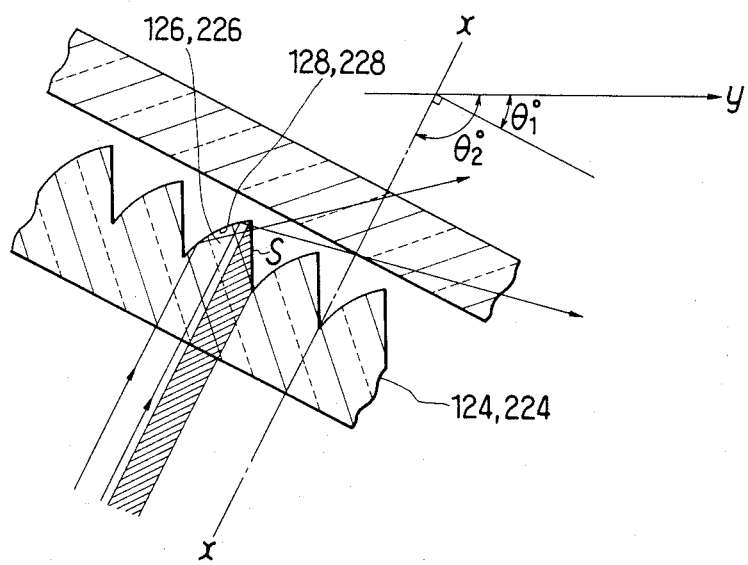
FIG. 15 is a view corresponding to FIG. 14 but explanatory of a problem encountered with the devices of FIGS. 4 and 7 and solved by the embodiment of FIG. 11.

The previously disclosed stop lamps 110 and 210 also accomplish the vertical divergence of the emitted beam, both by convexing the reflective surfaces 128 or 228 of the prism element 126 or 226 of the lens 124 or 224. According to this lens configuration, however, the beam segments impinging on the opposite sides S, FIG. 15, of the prism elements 126 or 226 are not reflected in the predetermined direction y. The beam segments indicated by the hatching in FIG. 15 are therefore wasted.

The stop lamp 310 of FIGS. 11 through 14 remedies this weakness of the stop lamps 110 and 210. As demonstrated by the arrow headed lines in FIG. 14, the diverging lens elements 330 on the inner surface of the outer lens 324 of the stop lamp 310 can be configured to converge the incident rays only on the reflective surfaces 328 of the prism elements 326 on the outer surface of the outer lens, thereby to be wholly reflected in the desired direction y. An additional advantage of this stop lamp 310 is that the prism elements 330 have flat sides only, making easier the preparation of the mold for the fabrication of the outer lens 324.

Modification of the Fourth Form

Figure 16:
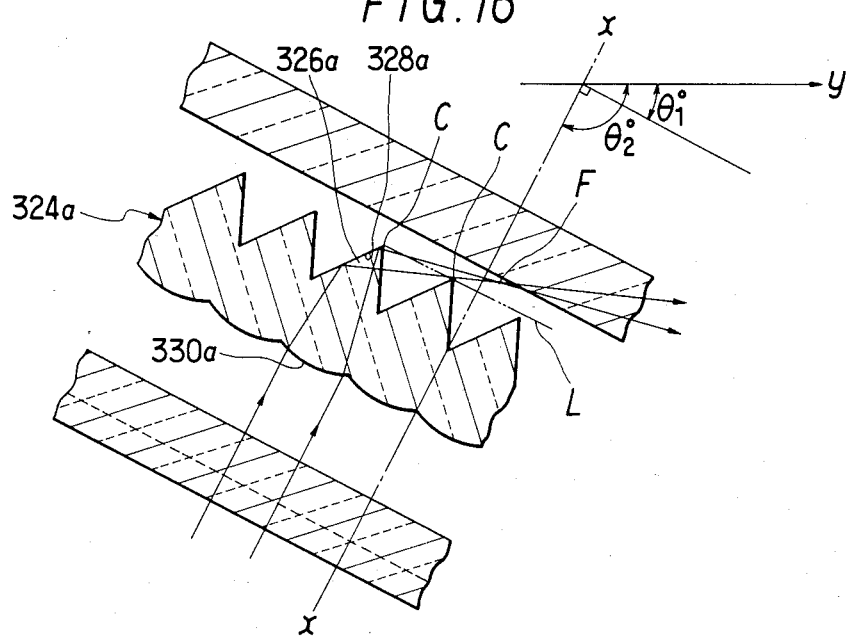
FIG. 16 is a view similar to FIG. 14 but showing a slight modification of the embodiment of FIG. 11.

FIG. 16 is a fragmentary illustration of a further supplemental high mounted stop lamp representing a slight modification of the last disclosed stop lamp 310. Although the lens elements 330 on the inner surface of the outer lens 324 of the stop lamp 310 have been described as "diverging" since the light rays that have traversed same become divergent on leaving the stop lamp, these lens elements 330 are, in fact, converging lenses, converging the incident rays at points slightly outwardly thereof. The modified stop lamp of FIG. 16 features its outer lens 324a. This outer lens 324a is such that the focus F of each diverging lens element 330a on its inner surface is located on or outwardly of an imaginary straight line L connecting the crests C of the prism elements 326a on the outer surface of the outer lens. This configuration of the outer lens 324a enables the reflective surfaces 328a of the prism elements 326a to reflect all of the incident converging light rays in the predetermined beam direction y.

Figure 17:
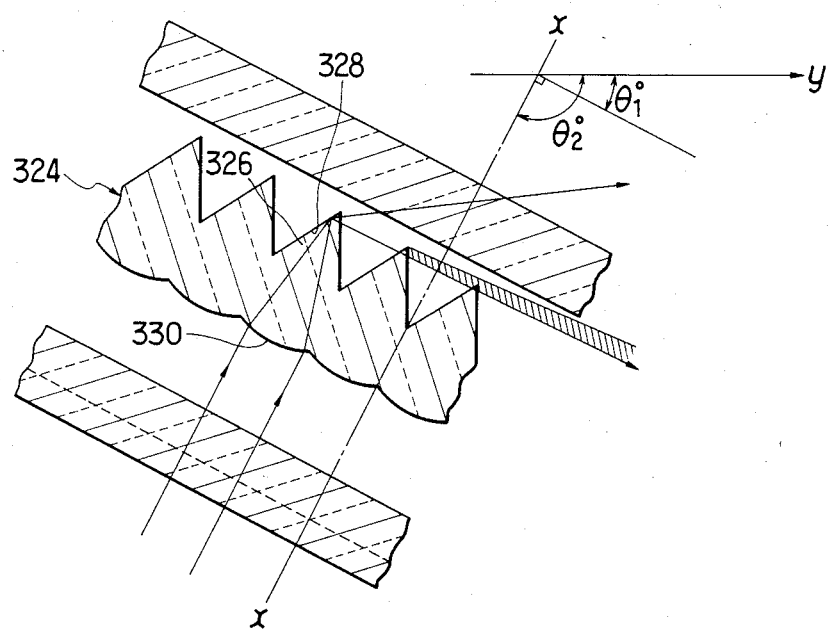
FIG. 17 is a view similar to FIG. 16 but explanatory of a problem remedied by the device of FIG. 16.

The above advantage gained by the modified outer lens 324a will become more understandable when taken in light of the showing of FIG. 17. This figure depicts the path of the light rays through the outer lens 324 of the stop lamp 310 wherein each diverging lens element 330 converges the incident light rays at a focus located inwardly of the line connecting the crests of the prism elements 326. Part of the light beam that has been reflected by the reflective surfaces 328 is obstructed by the neighboring prism elements 326, resulting in the wasting of the beam segments indicted by the hatching in FIG. 17. Preferably, for the full delivery of the reflected light rays in the desired beam direction y, the focus F of each diverging lens element 330a should be located outwardly of the line L, as in the showing of FIG. 16.

Fifth Form

A further preferable form of supplemental high mounted stop lamp 410 shown in FIGS. 18 through 21 is also of the two lens configuration, having an inner lens 432 and an outer lens 424 mounted at the open front end 18 of the lens body 14. The inner lens 432 is similar to the inner lens 332 of the stop lamp 310. As will be seen from both FIGS. 18 and 19, the inner lens 432 has formed on its inner surface a plurality or multiplicity of diverging lens elements 434 in the form of parallel ridges of substantially semicircular cross section extending in its height direction. The lens elements 434 function to diverge the incident light rays laterally of the stop lamp 410. The outer surface of the inner lens 432 is planar.

Figure 18:
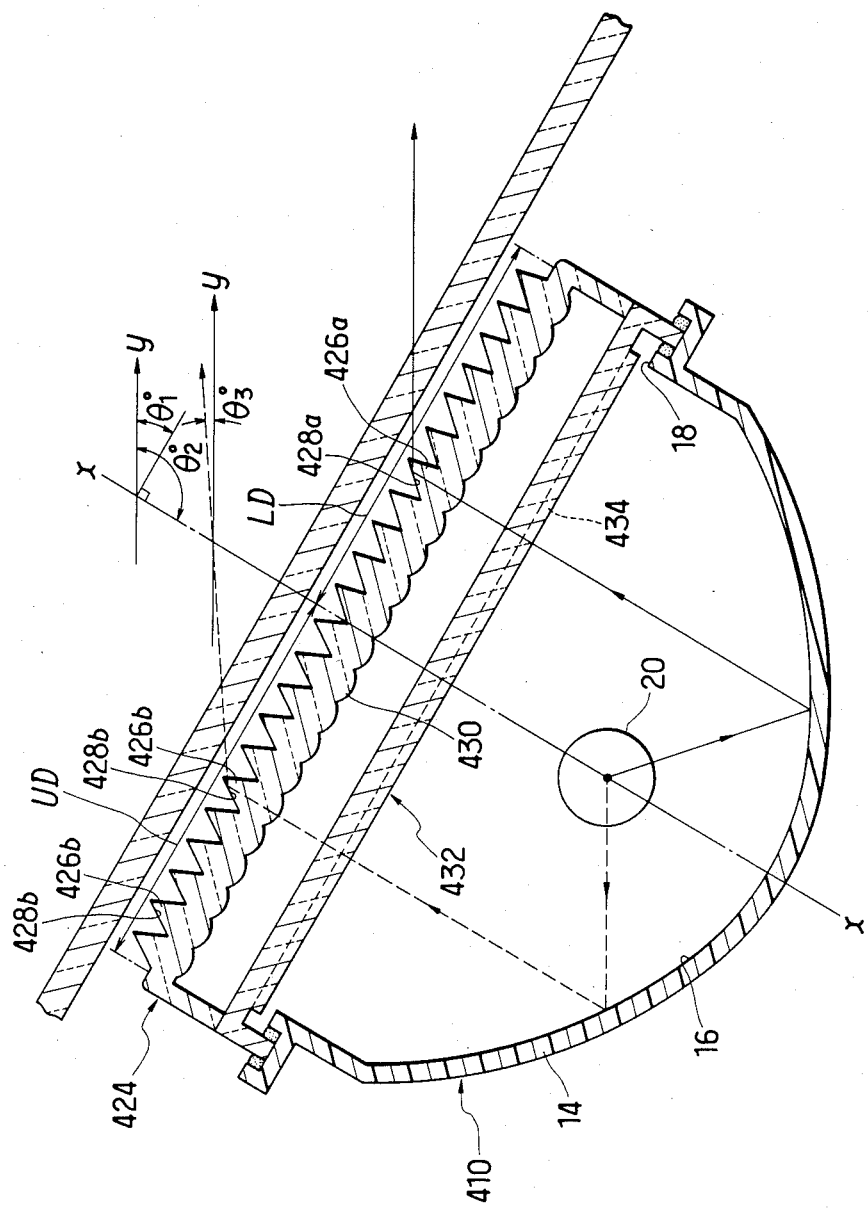
FIG. 18 is an axial section through a further example of supplemental high mounted stop lamp embodying the present invention.
Figure 19:
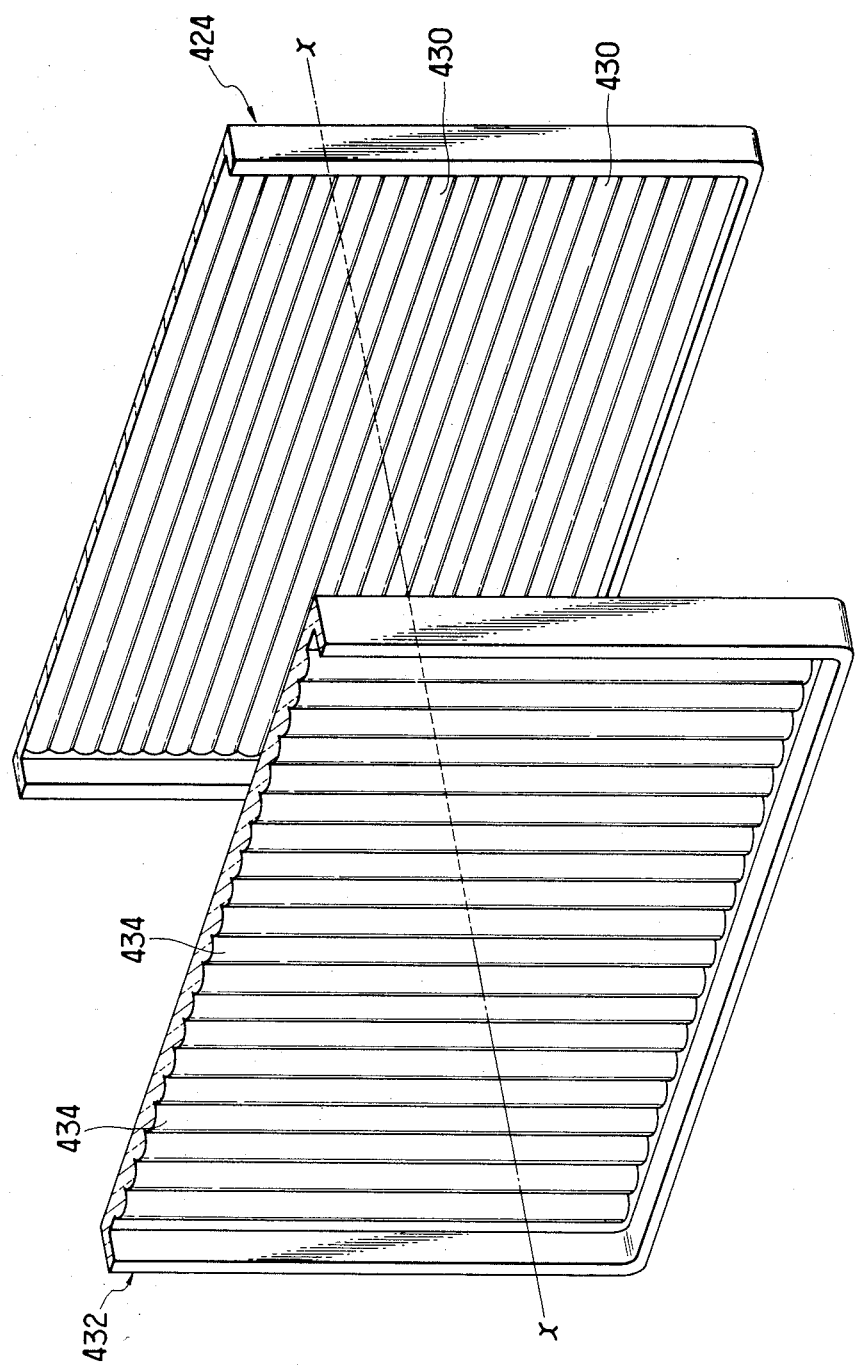
FIG. 19 is a fragmentary perspective view showing the inner and outer lenses of the supplemental stop lamp of FIG. 18.
Figure 20:
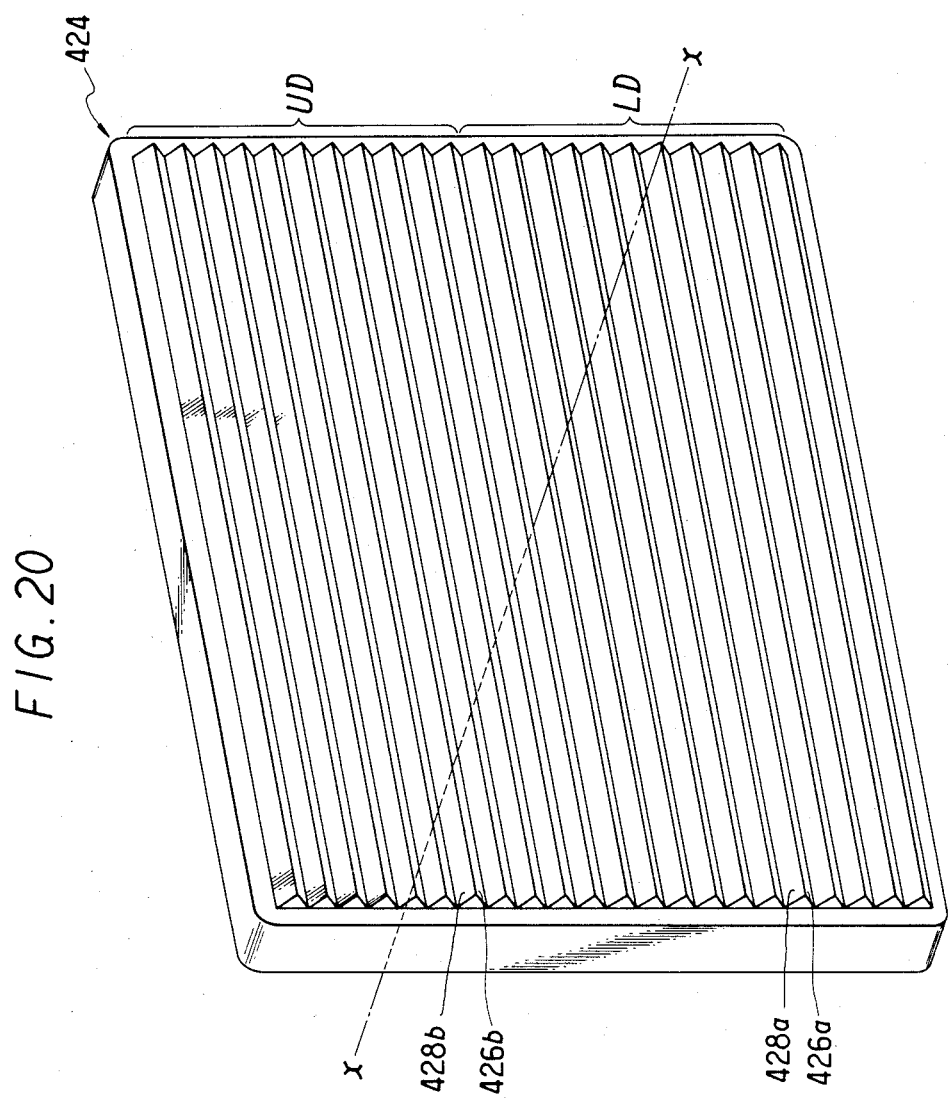
FIG. 20 is a perspective view of the outer lens of the supplemental stop lamp of FIG. 18.

Reference is directed to FIGS. 18, 19 and 20 for a study of the configuration of the outer lens 424. It has formed on its inner surface a plurality or multiplicity of diverging lens elements 430 in the form of parallel ridges of approximately semicircular cross section. Extending laterally, or at right angles with the diverging lens elements 434 on the inner lens 432, the diverging lens elements 430 serve to impart vertical divergence to the the outgoing light rays by first converging the incident rays at the focuses that have been explained in connection with FIGS. 16 and 17 and which will be described in more detail subsequently.

Before proceeding further with the description of the outer lens 424, let us assume for the easier understanding of this and following embodiments of the invention that this outer lens consists of a notional pair of halves divided along a lateral plane passing the optical axis x—x. The two notional halves or divisions of the outer lens 424 are indicated in FIGS. 18, 20 and 21 and will hereinafter be referred to as the lower division LD and upper division UD.

The outer lens 424 has two groups of prism elements 426a and 426b formed on the outer surface of its two division LD and US respectively for internally reflecting the incident rays in slightly different directions. The prism elements 426a on the lower division LD are in the form of parallel ridges of triangular cross section extending laterally or horizontally. These prism elements have planar reflective surfaces 428a, oriented away from the predetermined beam direction y, which surfaces are angled to internally reflecting the incident light rays in that beam direction. The other group of prism elements 426b on the upper division UD of the outer lens 424 are also shown as parallel ridges of triangular cross section extending laterally or horizontally. The prism elements 426b have planar reflective surfaces 428b, oriented away from the predetermined beam direction y, which surfaces are angled to internally reflect the incident light rays in a direction offset a relatively small predetermined angle of $\theta 3$ degrees upwardly from the desired beam direction y.

Figure 21:
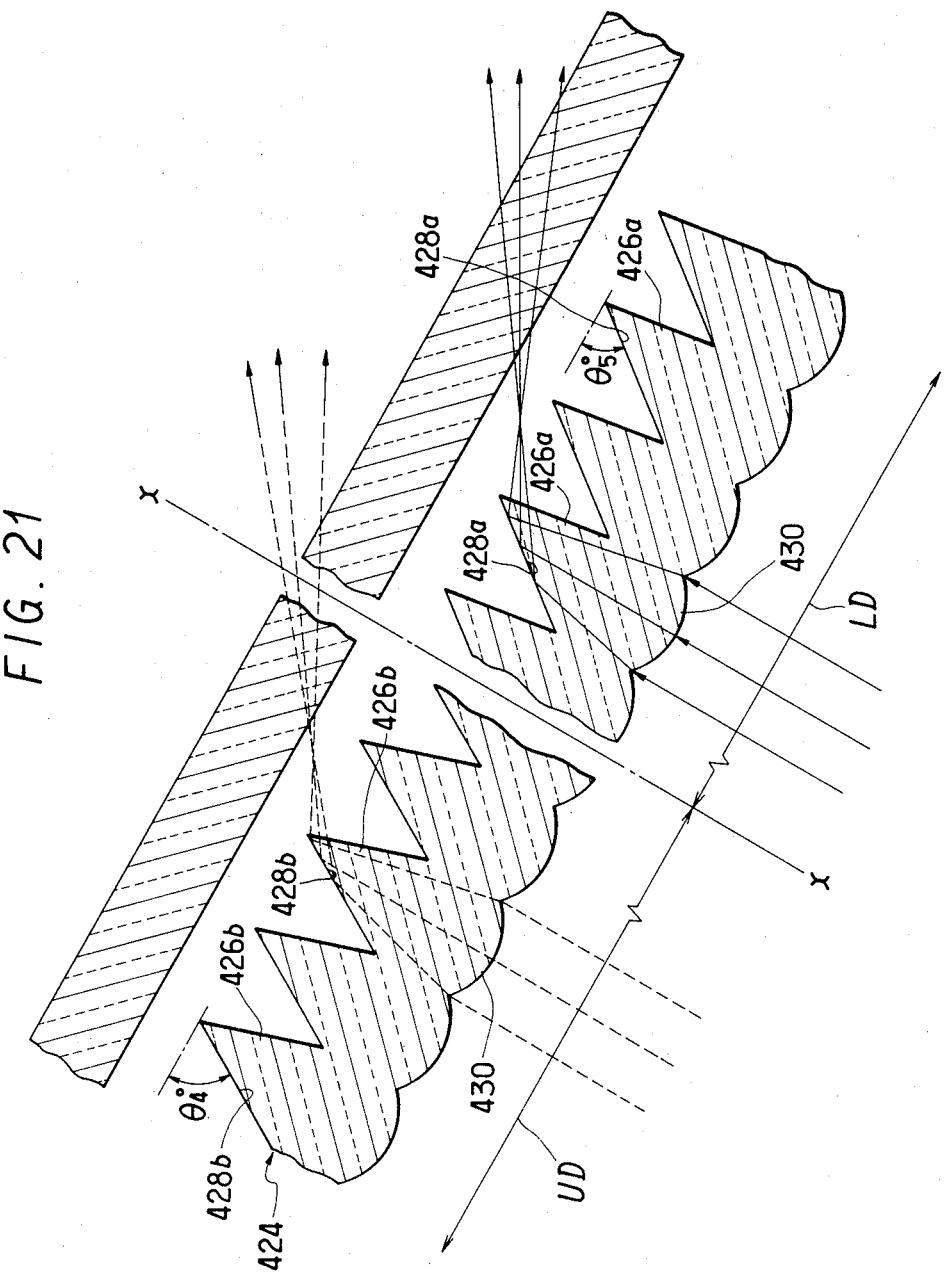
FIG. 21 is an enlarged, fragmentary axial section through the supplemental stop lamp of FIG. 18, which is explanatory of operation.

The above structural features of the two groups of prism elements 426a and 426b on the outer surface of the outer lens 424 will become better understood from an inspection of FIG. 21. The angle θ4 of the reflective surfaces 428b of the prism elements 426b with respect to the general plane of the outer lens 424 is slightly greater than the angle θ5 of the reflective surfaces 428a of the prism elements 426a with respect to the same plane.

The stop lamp 410 is analogous in the other structural details with the first described stop lamp 10.

In the operation of this stop lamp 410 the light rays produced by the bulb 20 and rendered parallel to the optical axis x—x by the paraboloidal reflector 16 are first made divergent laterally by the diverging lens elements 434 on the inner surface of the inner lens 432. Subsequently impinging on the diverging lens elements 430 on the inner surface of the outer lens 424, the light rays are focused at points slightly beyond the reflective surfaces 428a and 428b of the prism elements 426a and 426b on the outer surface of the outer lens, as has been explained in conjunction with FIGS. 16 and 17.

In FIGS. 18 and 21 the light rays traversing those of the lens elements 430 of the outer lens 424 which are in its lower division LD are indicated by the solid lines, and the light rays traversing the other lens elements 430, which are in the upper division UD of the outer lens are indicated by the dashed lines. The solid line light rays are, of course, converged at points slightly beyond the reflective surfaces 428a of the lower division prism elements 426a, thereby to be internally reflected in the predetermined beam direction y. The dashed line light rays are likewise converged at points slightly beyond the reflective surfaces 428b of the upper division prism elements 426b, thereby to be internally reflected and oriented in a direction slightly displaced upwardly of the predetermined beam direction y. The focal points of the lens elements 430 on the inner surface of the outer lens 424 are located so close to the reflective surfaces 428a and 428b of the prism elements 426a and 426b that the two beams from the two divisions LD and US of the outer lens both become divergent vertically, besides diverging laterally owing to the provision of the inner lens 432 with its lens elements 434.

Figure 22:
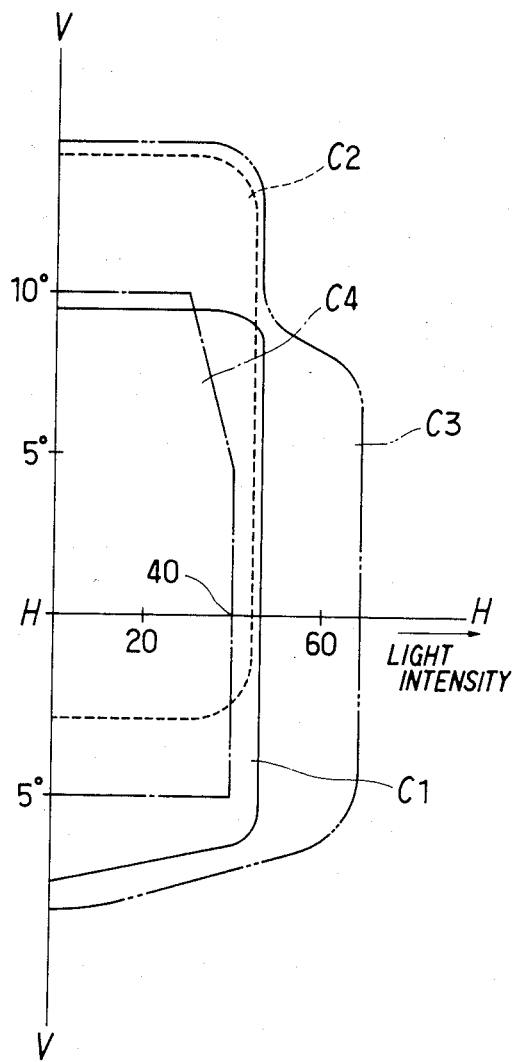
FIG. 22 is a graphic representation of the typical intensity distribution of the two split beams, and of the resultant thereof, produced by the supplemental stop lamp of FIG. 18.

FIG. 22 is a graphic representation of the vertical intensity distributions of the two angularly offset beams of light, and the resultant of these beams, emitted by the stop lamp 410. The curve C1 in the graph represents the vertical intensity distribution of the light beam from the lower division LD of the outer lens 424, the curve C2 that of the light beam from the upper division UD, and the curve C3 that of the resultant of the two light beams. It will be observed from the curves C1 and C2 that the light beams from the two divisions LD and UD of the outer lens 424 are vertically offset from, but mostly in an overlapping relation to, each other. The intensity distribution of the light beam from the lower division LD is approximately the same on the opposite sides of the horizontal axis H—H. The intensity distribution of the light beam from the upper division UD, on the other hand, is significantly less below the horizontal axis H—H than above. Thus, as represented by the curve C3, the overall light beam emitted by the stop lamp 410 provides a greater vertical coverage, both upwardly and downwardly, than the standard curve C4 set up by the Society of Automotive Engineers (SAE) for supplemental high mounted stop lamps. The intensity of the overall light beam of the stop lamp 410 is also greater at all the angles of concern than the standard curve C4.

Sixth Form

Figure 23:
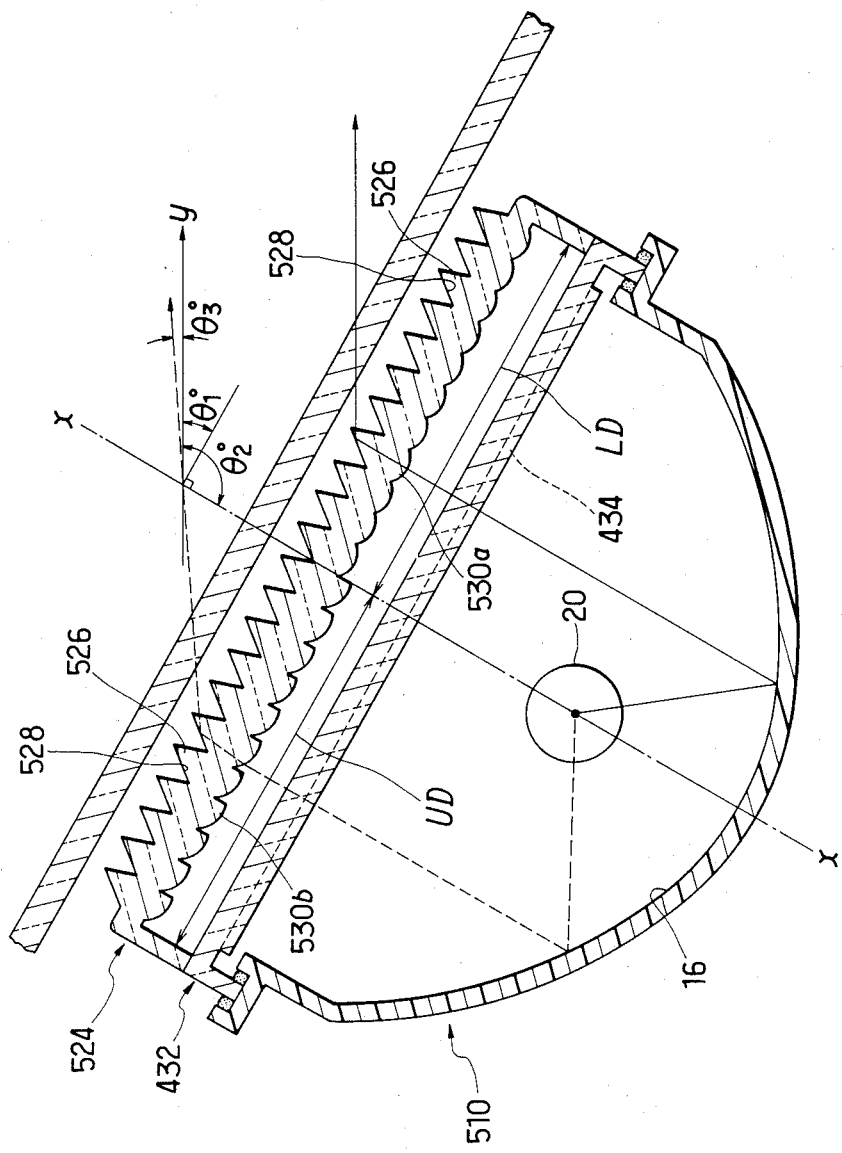
FIG. 23 is an axial section through a further example of supplemental high mounted stop lamp embodying the present invention.
Figure 24:
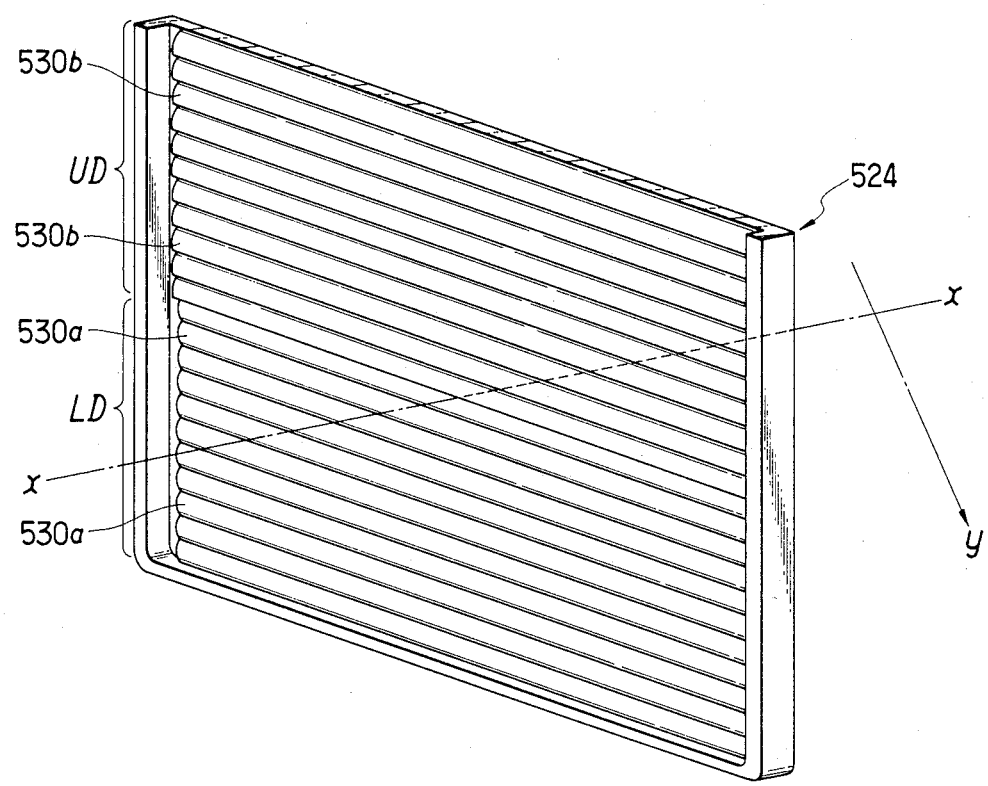
FIG. 24 is a fragmentary perspective view of the outer lens of the supplemental stop lamp of FIG. 23.
Figure 25:
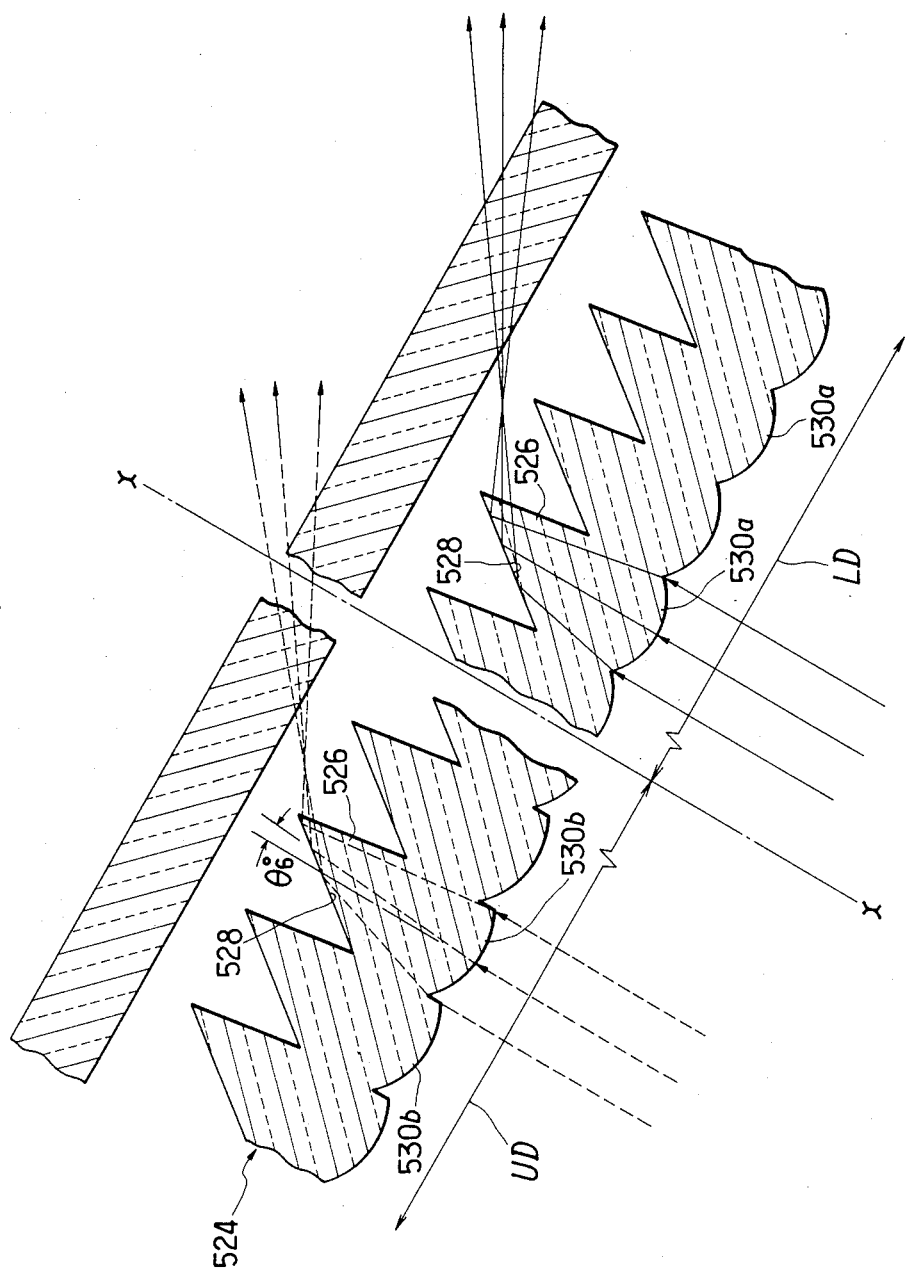
FIG. 25 is an enlarged, fragmentary axial section through the supplemental stop lamp of FIG. 23, which is explanatory of operation.

FIGS. 23 through 25 illustrate a further preferred form of supplemental high mounted stop lamp 510 in accordance with the invention. This stop lamp features an outer lens 524 of different configuration from the outer lens 424 of the FIGS. 18 through 21 stop lamp 410. The other details of construction of the stop lamp 510 are as set forth above in connection with the stop lamp 410. only the outer lens 524 of the stop lamp 510 will therefore be described in detail, and the other parts of this stop lamp will be identified, as necessary, by the same reference characters as used to denote the corresponding parts of the stop lamp 410.

The outer lens 524 has a plurality or multiplicity of prism elements 526 of like configuration formed on its outer surface. In the form of parallel ridges of triangular cross section, the prism elements 526 extend laterally of the stop lamp 510. Each prism element 526 has a reflective surface 528, oriented away from the predetermined beam direction y, for internally reflecting the incident light rays in that beam direction.

The outer lens 524 has formed on its inner surface two groups of diverging lens elements 530a and 530b which are arranged in its two divisions LD and UD, respectively, and which function to converge the incident light rays at points slightly beyond the reflective surfaces 528 of the corresponding prism elements 526. Located in the lower division LD of the outer lens 424, the lens elements 530a are shown as parallel ridges of convex cross section extending laterally of the stop lamp 510. As indicated in both FIGS. 23 and 25, the optical axes of these lens element 530a extend parallel to the optical axes x—x of the stop lamp 510. The other group of lens elements 530b are also in the form of ridges of convex cross section all extending in the same direction as the lens element 530a. It will be noted from FIG. and 25 that the optical axes of these lens elements 530b extend at a predescribed angle θ6 with the axis x—x, such that the incident light rays parallel to the axis x—x are directed downwardly. Consequently, the angle of incidence of the light rays on the reflective surfaces 528 of the upper division prism elements 526 is greater than that of the light rays falling on the reflective surfaces 528 of the lower division prism elements 526.

As in the case of the FIGS. 18 to 21 stop lamp 410, the inner lens 432 of this stop lamp 510 functions to impart principally lateral divergence to the light rays that have been produced by the bulb 20 and subsequently rendered parallel to the optical axis x—x by the reflector 16.

As indicated by the solid lines in both FIGS. 23 and 25, that part of the light rays subsequently falling on the lens elements 530a at the lower division LD of the outerlens 524 is thereby converged and directed toward the reflective surfaces 528 of the corresponding prism elements 526. Impinging on these reflective surfaces 528 in a direction substantially parallel to the axis x—x, the light rays are thereby reflected in the desired beam direction y.

The remainder of the laterally divergent light rays from the inner lens 432 falls on the lens elements 530b at the upper division UD of the outer lens 524, as indicated by the dashed lines in FIGS. 23 and 25. The lens elements 530b focus the incident light rays at points slightly beyond the reflective surfaces 528 of the corresponding prism elements 526, causing such rays to strike the reflective surfaces in a direction offset downwardly through the predetermined angle of θ6 degrees from the axis x—x. Accordingly, internally reflected by these reflective surfaces 528 at the upper division UD of the outer lens 524, the light rays are emitted in a direction that is θ3 degrees upward of the predetermined beam direction y.

The vertical intensity distribution of the light beam from the lower division LD of the outer lens 524 is substantially as represented by the curve C1 in the graph of FIG. 22, and that of the light beam from the upper division UD of the outer lens 524 substantially as represented by the curve C2 in the same graph. Thus, as in the case of the stop lamp 410, the two light beams produced by this stop lamp 510 are also vertically offset from each other but mostly overlap, resulting in the composite light beam having the favorable vertical intensity distribution as represented by the curve C3 in the graph of FIG. 22.

Seventh Form

Figure 26:
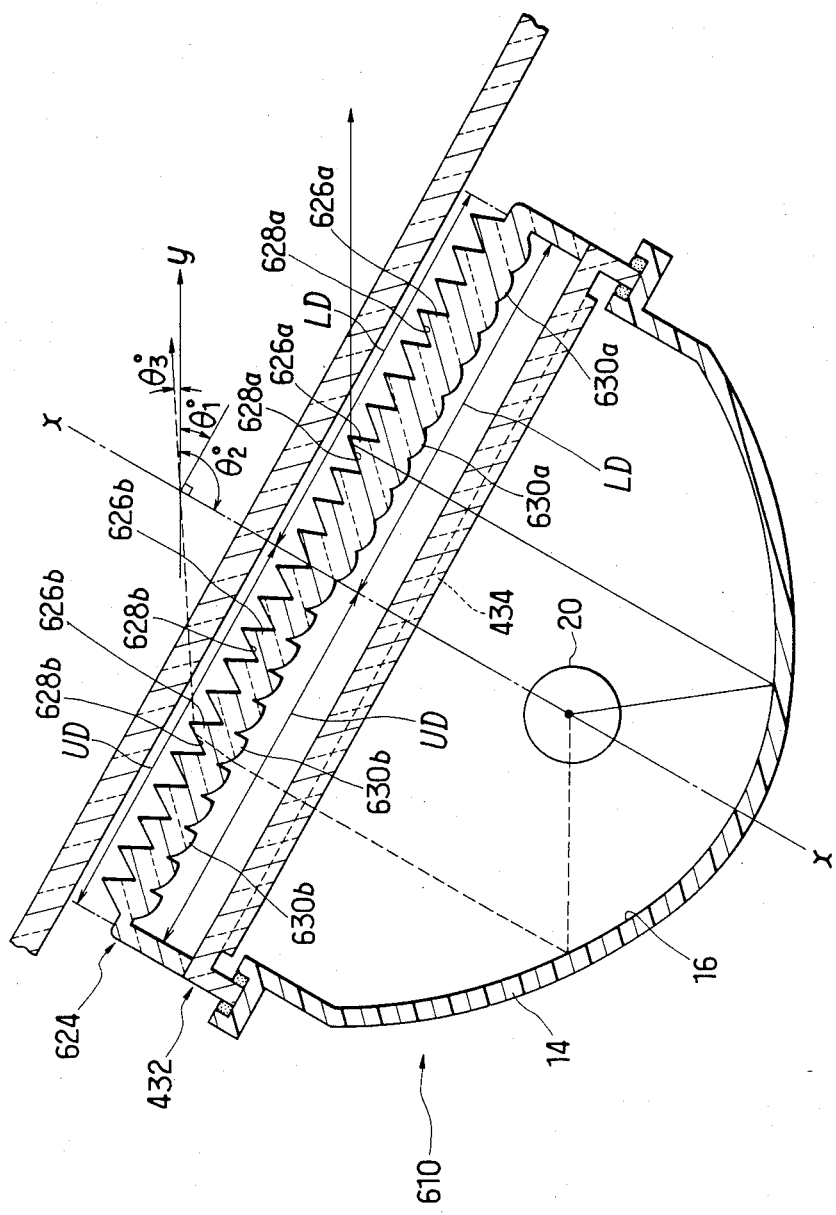
FIG. 26 is an axial section through a still further example of supplemental high mounted stop lamp embodying the present invention.
Figure 27:
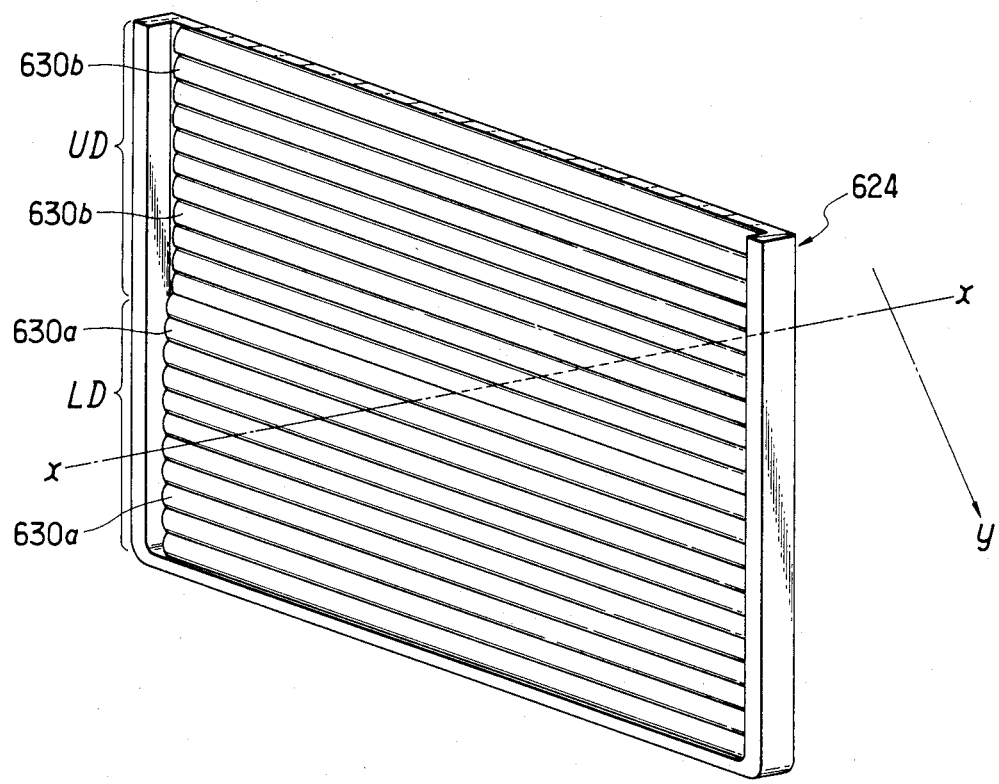
FIG. 27 is a fragmentary perspective view of the outer lens of the supplemental stop lamp of FIG. 26.

In FIGS. 26 through 28 is shown a still further example of supplemental high mounted stop lamp 610 in accordance with the invention. This stop lamp 610 also differs from the FIGS. 18 through 21 stop lamp 410 only in its outer lens 624. The other details of construction of the stop lamp 610 are as set forth above in connection with the stop lamp 410. Only the outer lens 624 of the stop lamp 610 will therefore be described in detail, and the other parts of this stop lamp will be identified, as necessary, by the same reference characters as used to denote the corresponding parts of the stop lamp 410.

The outer lens 624 of the stop lamp 610 has formed on its outer surface two groups of prism elements 626a and 626b for reflecting the incident light rays in slightly vertically different directions. The group of prism elements 626a and 626b are all in the form of ridges of triangular cross section extending laterally of the stop lamp 610. The prism elements 626a on the lower division LD of the outer lens 624 have reflective surfaces 628a, oriented away from the predetermined beam direction y, for internally reflecting the incident light rays in that beam direction as such rays fall thereon in a direction parallel to the optical axis x—x of the stop lamp 610.

The other group of prism elements 626b on the upper division UD of the outer lens 624 have planar reflective surfaces 628b, oriented away from the predetermined beam direction y, which surfaces are angled to internally reflect the incident light rays in a direction offset a relatively small predetermined angle of θ3 degrees upwardly from the desired beam direction y.

The above structural features of the two groups of prism elements 626a and 626b on the outer surface of the outer lens 624 will become better understood from an inspection of FIG. 28. The angle θ7 of the reflective surfaces 628b of the prism elements 626b with respect to the general plane of the outer lens 624 is slightly greater than the angle θ8 of the reflective surfaces 628a of the prism elements 626a with respect to these same plane.

The outer lens 624 of this stop lamp 610 has two different groups of lens elements 630a and 630b formed on the lower and upper divisions LD and UD, respectively, of its inner surface for converging the light rays at points slightly beyond the reflective surfaces 628a and 628b, respectively, of the prism elements 626a and 626b. All in the form of ridges of convex cross section extending laterally of the stop lamp 610, the two groups of lens elements 630a and 639b have different converging angles and have their optical axes set at different angles to the reflective surfaces 628a and 628b, respectively, of the prism elements 626a and 626b, as will be hereinafter explained in more detail.

As indicated by the dot and dash lines in FIGS. 26 and 28, the optical axes of the lens elements 630a on the lower division LD of the outer lens 624 extend parallel to the axis x—x of the stop lamp 610. The optical axes of the lens elements 630b on the upper division UD of the outer lens 624 is offset a predetermined angle of θ9 degrees downwardly from the axis x—x. Accordingly, the light rays that have been converged by the lens elements 630a impinge on the reflective surfaces 628a of the prism elements 626a at a smaller angle of incidence than the light rays that have been converged by the lens elements 630b impinge on the reflective surfaces 628b of the prism elements 626b.

Further, as is evident from FIG. 28, the lens elements 630a on the lower division LD of the outer lens 624 have each a radius of curvature r1 slightly more than the radius of curvature r2 of each lens element 630b on the upper division UD of the outer lens. Thus the converging angle of the lower division lens elements 630a is less than that of the upper division lens elements 630b.

In the operation of this stop lamp 610, the inner lens 432 functions just like that of the stop lamp 410, imparting principally lateral divergence to the light rays that have been produced by the bulb 20 and subsequently rendered parallel to the optical axis x—x by the paraboloidal reflector 16. As indicated by the solid lines in both FIGS. 26 and 28, those parts of the light rays subsequently falling on the lens elements 630a on the lower division LD of the outer lens 624 are thereby converged with a relatively small angle of convergence and are directed toward the reflective surfaces 628a of the lower division prism elements 626a along the paths parallel to the optical axis x—x. Impinging on these lower division reflective surfaces 628a, the light rays are thereby internally reflected and emitted substantially in the desired beam direction y with a relatively small angle of vertical divergence.

The remainder of the laterally divergent light rays from the inner lens 432 falls on the lens elements 630b on the upper division UD of the outer lens 624, as indicated by the dashed lines in FIGS. 26 and 28. The upper division lens elements 630b fucus the incident light rays with a relatively large angle of convergence at points slightly beyond the reflective surfaces 628b of the upper division prism elements 626b, causing such rays to strike the reflective surfaces in a direction offset downwardly through the predetermined angle of θ9 degrees from the axis x—x. Accordingly, internally reflected by these reflective surfaces 628b of the upper division prism elements 626b, the light rays are emitted with a relatively large angle of vertical divergence in a direction slightly displaced upwardly of the predetermined beam direction y.

Such being the optical performance of this stop lamp 610, it will be seen that the light beam from the lower division LD of the outer lens 624 diverges over a smaller vertical angle than the corresponding light beam of the FIGS. 18 through 21 stop lamp 410 as represented by the curve C1 in the graph of FIG. 22 but is greater in intensity. The light beam from the upper division UD of the outer lens 624, on the other hand, is angled somewhat higher than the corresponding light beam of the stop lamp 410 as represented by the curve C2 in the graph of FIG. 22. Accordingly, the light beams from the two divisions LD and UD of the outer lens 624 are vertically displaced a slightly greater angle than are the light beams from the stop lamp 410. However, since the light beam from the lower divison LD is increased in intensity as aforesaid, the resultant of the two light beams emitted by this stop lamp 610 possesses greater intensity in the neighborhood of the horizontal axis H—H.

Thus, according to the last disclosed three stop lamps 410, 510 and 610, there are produced two angularly displaced light beams which overlap to provide a desired vertical intensity distribution. This vertical intensity distribution is variable as required by changing the relative angular orientations of the two beams. As will be understood, howver, it is not essential in these stop lamps that the outer lens be divided into a pair of halves in its height direction. The outer lens may rather be divided in its lateral direction, or prism elements and/or lens elements of different optical characteristics may be alternately arranged one by one or in groups of two or more. It will also be seen that the outer lens may be divided into unequal parts, rather than into a pair of halves, to produce light beams of correspondingly different intensities.

Although the present invention has been shown and described hereinabove as embodied in supplemental high mounted stops lamps for vehicular use, it is understood that the lamp assembly of this invention lends itself to other applications where it is to be installed with its optical axis at a considerable angle to the intended direction of irradiation. A variety of modifications may also be made in the form, arrangements, and proportions of the parts employed in the above disclosed embodiments without departmenting from the scope of the invention.

What is claimed is:

1. A high mounted stop lamp assembly adapted to be mounted along the inside surface of an inclined rear window of a motor vehicle, said lamp assembly comprising:
    (a) a lamp body having an open front end;
    (b) a light source mounted within the lamp body for producing light;
    (c) a reflector provided inside of the lamp body with the configuration thereof being such that the light produced by the light source is reflected by the reflector as rays of light parallel to the optical axis of the lamp assembly;
    (d) a lens assembly covering the open end of the lamp body and extending generally along a plane perpendicular to the optical axis of the lamp assembly, said lens assembly including generally parallel inner and outer lenses;
    (e) said inner lens having a plurality of diverging lens elements for diverging the rays of light reflected by the reflector into sidewise directions with respect to the motor vehicle;
    (f) said outer lens directing said rays of light to the direction rearwards of the motor vehicle;
    (g) a plurality of spaced parallel, linearly and horizontally extending prism elements being integrally formed on the outer surface of said outer lens, each of said prism elements having a generally triangular cross-section with one side thereof acting as a light reflecting surface; and
    (g) a plurality of light converging elements integrally formed on the inner surface of said outer lens for converging said rays of light onto the reflecting surfaces of said prism elements.

2. The high mounted stop lamp assembly of claim 1 wherein said light converging elements are spaced parallel and horizontally extending ridges of generally convex form are arranged corresponding to said prism elements.

3. The high mounted stop lamp assembly of claim 1 wherein said light reflecting surface is a planar surface.

4. The high mounted stop lamp assembly of claim 1 wherein said light reflecting surface is a concave surface as viewed in the cross-section, so that the light reflected by the reflecting surface is scattered in a predetermined range.

5. The high mounted stop lamp assembly of claim 1 wherein said outer lens is composed of at least two sections which are divided as viewed in the direction of the optical axis of the lamp assembly, said respective sections being adapted to throw beams of light which are parallel to each other, while intersecting at an angle with respect to each other and in a partially overlapping relation to each other.

6. The high mounted stop lamp assembly of claim 5, wherein said outer lens comprises two sets of prism elements, with the direction of the reflection of each set of the prism elements being different from each other.

7. The high mounted stop lamp assembly of claim 5, wherein said outer lens comprises two sets of light converging elements which are not parallel to each other.

8. The high mounted stop lamp assembly of claim 5, wherein said outer lens comprises two sets of light converging elements with the optical axis of each set of the light converging elements not being parallel to each other.

* * * * *